United States Patent
Jovanovski et al.

(10) Patent No.: US 9,880,268 B2
(45) Date of Patent: Jan. 30, 2018

(54) METHOD OF ERROR CORRECTION FOR 3D IMAGING DEVICE

(71) Applicant: Hand Held Products, Inc., Fort Mill, SC (US)

(72) Inventors: Brian L. Jovanovski, Syracuse, NY (US); Jingquan Li, Auburn, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 685 days.

(21) Appl. No.: 13/912,262

(22) Filed: Jun. 7, 2013

(65) Prior Publication Data
US 2014/0362184 A1 Dec. 11, 2014

(51) Int. Cl.
*G01B 11/00* (2006.01)
*G01B 11/24* (2006.01)
*G01S 7/497* (2006.01)
*G01S 17/89* (2006.01)

(52) U.S. Cl.
CPC .............. *G01S 7/497* (2013.01); *G01S 17/89* (2013.01)

(58) Field of Classification Search
CPC ......... G01S 7/497; G01S 17/89; G01B 11/00; G01B 11/24
See application file for complete search history.

(56) References Cited

U.S. PATENT DOCUMENTS

| | | |
|---|---|---|
| 3,971,065 A | 7/1976 | Bayer |
| 4,026,031 A | 5/1977 | Siddall et al. |
| 4,279,328 A | 7/1981 | Ahlbom |
| 4,398,811 A | 8/1983 | Nishioka et al. |
| 4,495,559 A | 1/1985 | Gelatt, Jr. |
| 4,730,190 A | 3/1988 | Win et al. |
| 4,803,639 A | 2/1989 | Steele et al. |
| 5,184,733 A | 2/1993 | Arnarson et al. |
| 5,198,648 A | 3/1993 | Hibbard |

(Continued)

FOREIGN PATENT DOCUMENTS

| | | |
|---|---|---|
| AU | 2004212587 A1 | 4/2005 |
| CN | 201139117 Y | 10/2008 |

(Continued)

OTHER PUBLICATIONS

U.S. Appl. No. 13/367,978, filed Feb. 7, 2012, (Feng et al.); now abandoned.

(Continued)

*Primary Examiner* — Behrooz Senfi
*Assistant Examiner* — Maryam Nasri
(74) *Attorney, Agent, or Firm* — Additon, Higgins & Pendleton, P.A.

(57) ABSTRACT

A method is presented for correcting errors in a 3D scanner. Measurement errors in the 3D scanner are determined by scanning each of a plurality of calibration objects in each of a plurality of sectors in the 3D scanner's field of view. The calibration objects have a known height, a known width, and a known length. The measurements taken by the 3D scanner are compared to the known dimensions to derive a measurement error for each dimension in each sector. An estimated measurement error is calculated based on scans of each of the plurality of calibration objects. When scanning target objects in a given sector, the estimated measurement error for that sector is used to correct measurements obtained by the 3D scanner.

20 Claims, 3 Drawing Sheets

(56) References Cited

U.S. PATENT DOCUMENTS

| | | |
|---|---|---|
| 5,220,536 A | 6/1993 | Stringer et al. |
| 5,331,118 A | 7/1994 | Jensen |
| 5,359,185 A | 10/1994 | Hanson |
| 5,384,901 A | 1/1995 | Glassner et al. |
| 5,548,707 A | 8/1996 | LoNegro |
| 5,555,090 A | 9/1996 | Schmutz |
| 5,561,526 A | 10/1996 | Huber et al. |
| 5,590,060 A | 12/1996 | Granville et al. |
| 5,606,534 A | 2/1997 | Stringer et al. |
| 5,619,245 A | 4/1997 | Kessler et al. |
| 5,655,095 A | 8/1997 | LoNegro et al. |
| 5,661,561 A | 8/1997 | Wurz et al. |
| 5,699,161 A | 12/1997 | Woodworth |
| 5,729,750 A | 3/1998 | Ishida |
| 5,730,252 A | 3/1998 | Herbinet |
| 5,732,147 A | 3/1998 | Tao |
| 5,734,476 A | 3/1998 | Dlugos |
| 5,737,074 A | 4/1998 | Haga et al. |
| 5,748,199 A | 5/1998 | Palm |
| 5,767,962 A | 6/1998 | Suzuki et al. |
| 5,831,737 A | 11/1998 | Stringer et al. |
| 5,850,370 A | 12/1998 | Stringer et al. |
| 5,850,490 A | 12/1998 | Johnson |
| 5,869,827 A | 2/1999 | Rando |
| 5,870,220 A | 2/1999 | Migdal et al. |
| 5,900,611 A | 5/1999 | Hecht |
| 5,923,428 A | 7/1999 | Woodworth |
| 5,929,856 A | 7/1999 | LoNegro et al. |
| 5,938,710 A | 8/1999 | Lanza et al. |
| 5,959,568 A | 9/1999 | Woolley |
| 5,960,098 A | 9/1999 | Tao |
| 5,969,823 A | 10/1999 | Wurz et al. |
| 5,978,512 A | 11/1999 | Kim et al. |
| 5,979,760 A | 11/1999 | Freyman et al. |
| 5,988,862 A | 11/1999 | Kacyra et al. |
| 5,991,041 A | 11/1999 | Woodworth |
| 6,009,189 A | 12/1999 | Schaack |
| 6,025,847 A | 2/2000 | Marks |
| 6,035,067 A | 3/2000 | Ponticos |
| 6,049,386 A | 4/2000 | Stringer et al. |
| 6,053,409 A | 4/2000 | Brobst et al. |
| 6,064,759 A | 5/2000 | Buckley et al. |
| 6,067,110 A | 5/2000 | Nonaka et al. |
| 6,069,696 A | 5/2000 | McQueen et al. |
| 6,115,114 A | 9/2000 | Berg et al. |
| 6,137,577 A | 10/2000 | Woodworth |
| 6,177,999 B1 | 1/2001 | Wurz et al. |
| 6,189,223 B1 | 2/2001 | Haug |
| 6,232,597 B1 | 5/2001 | Kley |
| 6,236,403 B1 | 5/2001 | Chaki |
| 6,246,468 B1 | 6/2001 | Dimsdale |
| 6,333,749 B1 | 12/2001 | Reinhardt et al. |
| 6,336,587 B1 | 1/2002 | He et al. |
| 6,369,401 B1 | 4/2002 | Lee |
| 6,373,579 B1 | 4/2002 | Ober et al. |
| 6,429,803 B1 | 8/2002 | Kumar |
| 6,457,642 B1 | 10/2002 | Good et al. |
| 6,507,406 B1 | 1/2003 | Yagi et al. |
| 6,517,004 B2 | 2/2003 | Good et al. |
| 6,519,550 B1 | 2/2003 | D'Hooge et al. |
| 6,674,904 B1 | 1/2004 | McQueen |
| 6,705,526 B1 | 3/2004 | Zhu et al. |
| 6,781,621 B1 | 8/2004 | Gobush et al. |
| 6,824,058 B2 | 11/2004 | Patel et al. |
| 6,832,725 B2 | 12/2004 | Gardiner et al. |
| 6,858,857 B2 | 2/2005 | Pease et al. |
| 6,922,632 B2 | 7/2005 | Foxlin |
| 6,971,580 B2 | 12/2005 | Zhu et al. |
| 6,995,762 B1 | 2/2006 | Pavlidis et al. |
| 7,057,632 B2 | 6/2006 | Yamawaki et al. |
| 7,085,409 B2 | 8/2006 | Sawhney et al. |
| 7,086,162 B2 | 8/2006 | Tyroler |
| 7,104,453 B1 | 9/2006 | Zhu et al. |
| 7,128,266 B2 | 10/2006 | Marlton et al. |
| 7,137,556 B1 | 11/2006 | Bonner et al. |
| 7,159,783 B2 | 1/2007 | Walczyk et al. |
| 7,161,688 B1 | 1/2007 | Bonner et al. |
| 7,205,529 B2 | 4/2007 | Andersen et al. |
| 7,214,954 B2 | 5/2007 | Schopp |
| 7,277,187 B2 | 10/2007 | Smith et al. |
| 7,307,653 B2 | 12/2007 | Dutta |
| 7,310,431 B2 | 12/2007 | Gokturk et al. |
| 7,413,127 B2 | 8/2008 | Ehrhart et al. |
| 7,509,529 B2 | 3/2009 | Colucci et al. |
| 7,527,205 B2 | 5/2009 | Zhu et al. |
| 7,586,049 B2 | 9/2009 | Wurz |
| 7,602,404 B1 | 10/2009 | Reinhardt et al. |
| 7,639,722 B1 | 12/2009 | Paxton et al. |
| 7,726,575 B2 | 6/2010 | Wang et al. |
| 7,780,084 B2 | 8/2010 | Zhang et al. |
| 7,788,883 B2 | 9/2010 | Buckley et al. |
| 7,974,025 B2 | 7/2011 | Topliss |
| 8,027,096 B2 | 9/2011 | Feng et al. |
| 8,028,501 B2 | 10/2011 | Buckley et al. |
| 8,050,461 B2 | 11/2011 | Shpunt et al. |
| 8,055,061 B2 | 11/2011 | Katano |
| 8,072,581 B1 | 12/2011 | Breiholz |
| 8,102,395 B2 | 1/2012 | Kondo et al. |
| 8,132,728 B2 | 3/2012 | Dwinell et al. |
| 8,134,717 B2 | 3/2012 | Pangrazio et al. |
| 8,149,224 B1 | 4/2012 | Kuo et al. |
| 8,194,097 B2 | 6/2012 | Xiao et al. |
| 8,201,737 B1 | 6/2012 | Palacios Durazo et al. |
| 8,212,889 B2 | 7/2012 | Chanas et al. |
| 8,228,510 B2 | 7/2012 | Pangrazio et al. |
| 8,230,367 B2 | 7/2012 | Bell et al. |
| 8,294,969 B2 | 10/2012 | Plesko |
| 8,305,458 B2 | 11/2012 | Hara |
| 8,310,656 B2 | 11/2012 | Zalewski |
| 8,313,380 B2 | 11/2012 | Zalewski et al. |
| 8,317,105 B2 | 11/2012 | Kotlarsky et al. |
| 8,322,622 B2 | 12/2012 | Suzhou et al. |
| 8,339,462 B2 | 12/2012 | Stec et al. |
| 8,350,959 B2 | 1/2013 | Topliss et al. |
| 8,351,670 B2 | 1/2013 | Ijiri et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,976 B2 | 2/2013 | Mohideen et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,437,539 B2 | 5/2013 | Komatsu et al. |
| 8,441,749 B2 | 5/2013 | Brown et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,463,079 B2 | 6/2013 | Ackley et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,570,343 B2 | 10/2013 | Halstead |
| 8,571,307 B2 | 10/2013 | Li et al. |
| 8,576,390 B1 | 11/2013 | Nunnink |

(56) References Cited

U.S. PATENT DOCUMENTS

| | | |
|---|---|---|
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,594,425 B2 | 11/2013 | Gurman et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,792,688 B2 | 7/2014 | Unsworth |
| 8,810,779 B1 | 8/2014 | Hilde |
| 8,897,596 B1 | 11/2014 | Passmore et al. |
| 8,928,896 B2 | 1/2015 | Kennington et al. |
| 9,014,441 B2 | 4/2015 | Truyen et al. |
| 9,082,195 B2 | 7/2015 | Holeva et al. |
| 9,142,035 B1 | 9/2015 | Rotman |
| 9,171,278 B1 | 10/2015 | Kong et al. |
| 9,233,470 B1 | 1/2016 | Bradski et al. |
| 9,235,899 B1 | 1/2016 | Kirmani et al. |
| 9,299,013 B1 | 3/2016 | Curlander et al. |
| 9,424,749 B1 | 8/2016 | Reed et al. |
| 9,486,921 B1 | 11/2016 | Straszheim et al. |
| 2001/0027995 A1 | 10/2001 | Patel et al. |
| 2001/0032879 A1 | 10/2001 | He et al. |
| 2002/0054289 A1 | 5/2002 | Thibault et al. |
| 2002/0067855 A1 | 6/2002 | Chiu et al. |
| 2002/0109835 A1 | 8/2002 | Goetz |
| 2002/0118874 A1 | 8/2002 | Chung et al. |
| 2002/0158873 A1 | 10/2002 | Williamson |
| 2002/0167677 A1 | 11/2002 | Okada et al. |
| 2002/0179708 A1 | 12/2002 | Zhu et al. |
| 2002/0196534 A1 | 12/2002 | Lizotte et al. |
| 2003/0038179 A1 | 2/2003 | Tsikos et al. |
| 2003/0053513 A1 | 3/2003 | Vatan et al. |
| 2003/0063086 A1 | 4/2003 | Baumberg |
| 2003/0078755 A1 | 4/2003 | Leutz et al. |
| 2003/0091227 A1 | 5/2003 | Chang et al. |
| 2003/0156756 A1 | 8/2003 | Gokturk et al. |
| 2003/0197138 A1 | 10/2003 | Pease et al. |
| 2003/0225712 A1 | 12/2003 | Cooper et al. |
| 2003/0235331 A1 | 12/2003 | Kawaike et al. |
| 2004/0008259 A1 | 1/2004 | Gokturk et al. |
| 2004/0019274 A1* | 1/2004 | Galloway, Jr. ......... A61B 90/36 600/425 |
| 2004/0024754 A1 | 2/2004 | Mane et al. |
| 2004/0066329 A1 | 4/2004 | Zeitfuss et al. |
| 2004/0073359 A1 | 4/2004 | Ichijo et al. |
| 2004/0083025 A1 | 4/2004 | Yamanouchi et al. |
| 2004/0089482 A1 | 5/2004 | Ramsden et al. |
| 2004/0098146 A1 | 5/2004 | Katae et al. |
| 2004/0105580 A1 | 6/2004 | Hager et al. |
| 2004/0118928 A1 | 6/2004 | Patel et al. |
| 2004/0122779 A1 | 6/2004 | Stickler et al. |
| 2004/0155975 A1 | 8/2004 | Hart et al. |
| 2004/0165090 A1 | 8/2004 | Ning |
| 2004/0184041 A1 | 9/2004 | Schopp |
| 2004/0211836 A1 | 10/2004 | Patel et al. |
| 2004/0214623 A1 | 10/2004 | Takahashi et al. |
| 2004/0233461 A1 | 11/2004 | Armstrong et al. |
| 2004/0258353 A1 | 12/2004 | Gluckstad et al. |
| 2005/0006477 A1 | 1/2005 | Patel |
| 2005/0117215 A1 | 6/2005 | Lange |
| 2005/0128193 A1 | 6/2005 | Popescu et al. |
| 2005/0128196 A1 | 6/2005 | Popescu et al. |
| 2005/0168488 A1 | 8/2005 | Montague |
| 2005/0211782 A1 | 9/2005 | Martin |
| 2005/0264867 A1 | 12/2005 | Cho et al. |
| 2006/0047704 A1 | 3/2006 | Gopalakrishnan |
| 2006/0078226 A1 | 4/2006 | Zhou |
| 2006/0108266 A1 | 5/2006 | Bowers et al. |
| 2006/0112023 A1 | 5/2006 | Horhann |
| 2006/0151604 A1 | 7/2006 | Zhu et al. |
| 2006/0159344 A1 | 7/2006 | Shao et al. |
| 2006/0213999 A1 | 9/2006 | Wang et al. |
| 2006/0232681 A1 | 10/2006 | Okada |
| 2006/0255150 A1 | 11/2006 | Longacre |
| 2006/0269165 A1 | 11/2006 | Viswanathan |
| 2006/0291719 A1 | 12/2006 | Ikeda et al. |
| 2007/0003154 A1 | 1/2007 | Sun et al. |
| 2007/0025612 A1 | 2/2007 | Iwasaki et al. |
| 2007/0031064 A1 | 2/2007 | Zhao et al. |
| 2007/0063048 A1 | 3/2007 | Havens et al. |
| 2007/0116357 A1 | 5/2007 | Dewaele |
| 2007/0127022 A1 | 6/2007 | Cohen et al. |
| 2007/0143082 A1 | 6/2007 | Degnan |
| 2007/0153293 A1 | 7/2007 | Gruhlke et al. |
| 2007/0171220 A1 | 7/2007 | Kriveshko |
| 2007/0177011 A1 | 8/2007 | Lewin et al. |
| 2007/0181685 A1 | 8/2007 | Zhu et al. |
| 2007/0237356 A1 | 10/2007 | Dwinell et al. |
| 2007/0291031 A1 | 12/2007 | Konev et al. |
| 2007/0299338 A1 | 12/2007 | Stevick et al. |
| 2008/0013793 A1 | 1/2008 | Hillis et al. |
| 2008/0035390 A1 | 2/2008 | Wurz |
| 2008/0056536 A1 | 3/2008 | Hildreth et al. |
| 2008/0062164 A1 | 3/2008 | Bassi et al. |
| 2008/0077265 A1 | 3/2008 | Boyden |
| 2008/0079955 A1 | 4/2008 | Storm |
| 2008/0164074 A1 | 6/2008 | Wurz |
| 2008/0185432 A1 | 8/2008 | Caballero et al. |
| 2008/0204476 A1 | 8/2008 | Montague |
| 2008/0212168 A1 | 9/2008 | Olmstead et al. |
| 2008/0247635 A1 | 10/2008 | Davis et al. |
| 2008/0273191 A1 | 11/2008 | Kim et al. |
| 2008/0273210 A1 | 11/2008 | Hilde |
| 2008/0278790 A1 | 11/2008 | Boesser et al. |
| 2009/0059004 A1 | 3/2009 | Bochicchio |
| 2009/0081008 A1 | 3/2009 | Somin et al. |

(56) References Cited

U.S. PATENT DOCUMENTS

| | | |
|---|---|---|
| 2009/0095047 A1 | 4/2009 | Patel et al. |
| 2009/0134221 A1 | 5/2009 | Zhu et al. |
| 2006/0159307 A1 | 7/2009 | Anderson et al. |
| 2009/0195790 A1 | 8/2009 | Zhu et al. |
| 2009/0225333 A1 | 9/2009 | Bendall et al. |
| 2009/0237411 A1 | 9/2009 | Gossweiler et al. |
| 2009/0268023 A1 | 10/2009 | Hsieh |
| 2009/0272724 A1 | 11/2009 | Gubler |
| 2009/0273770 A1 | 11/2009 | Bauhahn et al. |
| 2009/0313948 A1 | 12/2009 | Buckley et al. |
| 2009/0318815 A1 | 12/2009 | Barnes et al. |
| 2009/0323084 A1 | 12/2009 | Dunn et al. |
| 2009/0323121 A1 | 12/2009 | Valkenburg |
| 2010/0035637 A1 | 2/2010 | Varanasi et al. |
| 2010/0060604 A1 | 3/2010 | Zwart et al. |
| 2010/0091104 A1 | 4/2010 | Sprigle |
| 2010/0113153 A1 | 5/2010 | Yen et al. |
| 2010/0118200 A1 | 5/2010 | Gelman et al. |
| 2010/0128109 A1 | 5/2010 | Banks |
| 2010/0150457 A1* | 6/2010 | Angell ............... G06K 9/4661 382/224 |
| 2010/0161170 A1 | 6/2010 | Siris |
| 2010/0171740 A1 | 7/2010 | Andersen et al. |
| 2010/0172567 A1 | 7/2010 | Prokoski |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0202702 A1 | 8/2010 | Benos et al. |
| 2010/0208039 A1 | 8/2010 | Stettner |
| 2010/0211355 A1 | 8/2010 | Horst et al. |
| 2010/0217678 A1 | 8/2010 | Goncalves |
| 2010/0220849 A1 | 9/2010 | Colbert et al. |
| 2010/0220894 A1 | 9/2010 | Ackley et al. |
| 2010/0223276 A1 | 9/2010 | Al-Shameri et al. |
| 2010/0245850 A1 | 9/2010 | Lee et al. |
| 2010/0254611 A1 | 10/2010 | Arnz |
| 2010/0303336 A1 | 12/2010 | Abraham |
| 2010/0315413 A1 | 12/2010 | Izadi et al. |
| 2010/0321482 A1 | 12/2010 | Cleveland |
| 2011/0019155 A1 | 1/2011 | Daniel et al. |
| 2011/0040192 A1 | 2/2011 | Brenner et al. |
| 2011/0043609 A1 | 2/2011 | Choi et al. |
| 2011/0099474 A1 | 4/2011 | Grossman et al. |
| 2011/0169999 A1 | 7/2011 | Grunow et al. |
| 2011/0188054 A1 | 8/2011 | Petronius et al. |
| 2011/0188741 A1 | 8/2011 | Sones et al. |
| 2011/0202554 A1 | 8/2011 | Powilleit et al. |
| 2011/0234389 A1 | 9/2011 | Mellin |
| 2011/0235854 A1 | 9/2011 | Berger et al. |
| 2011/0249864 A1 | 10/2011 | Venkatesan et al. |
| 2011/0254840 A1 | 10/2011 | Halstead |
| 2011/0279916 A1 | 11/2011 | Brown et al. |
| 2011/0286007 A1 | 11/2011 | Pangrazio et al. |
| 2011/0286628 A1 | 11/2011 | Goncalves et al. |
| 2011/0288818 A1 | 11/2011 | Thierman |
| 2011/0301994 A1 | 12/2011 | Tieman |
| 2011/0303748 A1 | 12/2011 | Lemma et al. |
| 2011/0310227 A1 | 12/2011 | Konertz et al. |
| 2012/0024952 A1 | 2/2012 | Chen |
| 2012/0056982 A1 | 3/2012 | Katz et al. |
| 2012/0057345 A1 | 3/2012 | Kuchibhotla |
| 2012/0067955 A1 | 3/2012 | Rowe |
| 2012/0074227 A1 | 3/2012 | Ferren et al. |
| 2012/0081714 A1 | 4/2012 | Pangrazio et al. |
| 2012/0111946 A1 | 5/2012 | Golant |
| 2012/0113223 A1 | 5/2012 | Hilliges et al. |
| 2012/0126000 A1 | 5/2012 | Kunzig et al. |
| 2012/0138685 A1 | 6/2012 | Qu et al. |
| 2012/0140300 A1 | 6/2012 | Freeman |
| 2012/0168511 A1 | 7/2012 | Kotlarsky et al. |
| 2012/0168512 A1 | 7/2012 | Kotlarsky et al. |
| 2012/0179665 A1 | 7/2012 | Baarman et al. |
| 2012/0185094 A1 | 7/2012 | Rosenstein et al. |
| 2012/0190386 A1 | 7/2012 | Anderson |
| 2012/0193407 A1 | 8/2012 | Barten |
| 2012/0193423 A1 | 8/2012 | Samek |
| 2012/0197464 A1 | 8/2012 | Wang et al. |
| 2012/0203647 A1 | 8/2012 | Smith |
| 2012/0218436 A1 | 9/2012 | Rodriguez et al. |
| 2012/0223141 A1 | 9/2012 | Good et al. |
| 2012/0224026 A1 | 9/2012 | Bayer et al. |
| 2012/0228382 A1 | 9/2012 | Havens et al. |
| 2012/0236288 A1 | 9/2012 | Stanley |
| 2012/0242852 A1 | 9/2012 | Hayward et al. |
| 2012/0113250 A1 | 10/2012 | Farlotti et al. |
| 2012/0248188 A1 | 10/2012 | Kearney |
| 2012/0256901 A1 | 10/2012 | Bendall |
| 2012/0261474 A1 | 10/2012 | Kawashime et al. |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0293625 A1 | 11/2012 | Schneider et al. |
| 2012/0294549 A1 | 11/2012 | Doepke |
| 2012/0299961 A1 | 11/2012 | Ramkumar et al. |
| 2012/0300991 A1 | 11/2012 | Mikio |
| 2012/0313848 A1 | 12/2012 | Galor et al. |
| 2012/0314030 A1 | 12/2012 | Datta |
| 2012/0314058 A1 | 12/2012 | Bendall et al. |
| 2012/0316820 A1 | 12/2012 | Nakazato et al. |
| 2013/0019278 A1 | 1/2013 | Sun et al. |
| 2014/0100813 A1 | 1/2013 | Showering |
| 2013/0038881 A1 | 2/2013 | Pesach et al. |
| 2013/0038941 A1 | 2/2013 | Pesach et al. |
| 2013/0043312 A1 | 2/2013 | Van Horn |
| 2013/0050426 A1 | 2/2013 | Sarmast et al. |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0082104 A1 | 4/2013 | Kearney et al. |
| 2013/0094069 A1 | 4/2013 | Lee et al. |
| 2013/0101158 A1 | 4/2013 | Lloyd et al. |
| 2013/0156267 A1 | 6/2013 | Muraoka et al. |
| 2013/0175341 A1 | 7/2013 | Kearney et al. |
| 2013/0175343 A1 | 7/2013 | Good |
| 2013/0200150 A1 | 8/2013 | Reynolds et al. |
| 2013/0200158 A1 | 8/2013 | Feng et al. |
| 2013/0201288 A1 | 8/2013 | Billerbaeck et al. |
| 2013/0208164 A1 | 8/2013 | Cazier et al. |
| 2013/0211790 A1 | 8/2013 | Loveland et al. |
| 2013/0214048 A1 | 8/2013 | Wilz |
| 2013/0223673 A1 | 8/2013 | Davis et al. |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0273492 A1* | 10/2013 | Suttin, Sr. ............ A61C 8/0001 433/29 |
| 2013/0278425 A1 | 10/2013 | Cunningham et al. |
| 2013/0287258 A1 | 10/2013 | Kearney |
| 2013/0291998 A1 | 11/2013 | Konnerth |
| 2013/0292474 A1 | 11/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedraro |
| 2013/0306734 A1 | 11/2013 | Xian et al. |
| 2013/0307964 A1 | 11/2013 | Bremer et al. |
| 2013/0308013 A1 | 11/2013 | Li et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0313326 A1 | 11/2013 | Ehrhart |
| 2013/0327834 A1 | 12/2013 | Hennick et al. |
| 2013/0329012 A1 | 12/2013 | Bartos |

(56) References Cited

U.S. PATENT DOCUMENTS

| | | |
|---|---|---|
| 2013/0329013 A1 | 12/2013 | Metois et al. |
| 2013/0341399 A1 | 12/2013 | Xian et al. |
| 2013/0342343 A1 | 12/2013 | Harring et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0009586 A1 | 1/2014 | McNamer et al. |
| 2014/0021256 A1 | 1/2014 | Qu et al. |
| 2014/0021259 A1 | 1/2014 | Moed et al. |
| 2014/0025584 A1 | 1/2014 | Liu et al. |
| 2014/0027518 A1 | 1/2014 | Edmonds et al. |
| 2014/0031665 A1 | 1/2014 | Pinto et al. |
| 2014/0034723 A1 | 2/2014 | Van Horn et al. |
| 2014/0034731 A1 | 2/2014 | Gao et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0058612 A1 | 2/2014 | Wong et al. |
| 2014/0061305 A1 | 3/2014 | Nahill et al. |
| 2014/0061306 A1 | 3/2014 | Wu et al. |
| 2014/0061307 A1 | 3/2014 | Wang et al. |
| 2014/0062709 A1 | 3/2014 | Hyer et al. |
| 2014/0063289 A1 | 3/2014 | Hussey et al. |
| 2014/0064624 A1 | 3/2014 | Kim et al. |
| 2014/0066136 A1 | 3/2014 | Sauerwein et al. |
| 2014/0067104 A1 | 3/2014 | Osterhout |
| 2014/0067692 A1 | 3/2014 | Ye et al. |
| 2014/0070005 A1 | 3/2014 | Nahill et al. |
| 2014/0071430 A1 | 3/2014 | Hansen et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0079297 A1 | 3/2014 | Tadayon et al. |
| 2014/0084068 A1 | 3/2014 | Gillet et al. |
| 2014/0086348 A1 | 3/2014 | Peake et al. |
| 2014/0091147 A1 | 4/2014 | Evans et al. |
| 2014/0097238 A1 | 4/2014 | Ghazizadeh |
| 2014/0097249 A1 | 4/2014 | Gomez et al. |
| 2014/0098091 A1 | 4/2014 | Hori |
| 2014/0098284 A1 | 4/2014 | Oberpriller et al. |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0104664 A1 | 4/2014 | Lee |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0133379 A1 | 5/2014 | Wang et al. |
| 2014/0135984 A1 | 5/2014 | Hirata |
| 2014/0139654 A1 | 5/2014 | Taskahashi |
| 2014/0140585 A1 | 5/2014 | Wang |
| 2014/0142398 A1 | 5/2014 | Patil et al. |
| 2014/0151453 A1 | 6/2014 | Meier et al. |
| 2014/0152975 A1 | 6/2014 | Ko |
| 2014/0158468 A1 | 6/2014 | Adami |
| 2014/0160329 A1 | 6/2014 | Ren et al. |
| 2014/0168380 A1 | 6/2014 | Heidemann et al. |
| 2014/0192187 A1 | 7/2014 | Atwell et al. |
| 2014/0192551 A1 | 7/2014 | Masaki |
| 2014/0201126 A1 | 7/2014 | Zadeh et al. |
| 2014/0205150 A1 | 7/2014 | Ogawa |
| 2014/0225918 A1 | 8/2014 | Mittal et al. |
| 2014/0225985 A1 | 8/2014 | Klusza et al. |
| 2014/0240454 A1 | 8/2014 | Lee |
| 2014/0247279 A1 | 9/2014 | Nicholas et al. |
| 2014/0247280 A1 | 9/2014 | Nicholas et al. |
| 2014/0267609 A1 | 9/2014 | Laffargue |
| 2014/0268093 A1 | 9/2014 | Tohme et al. |
| 2014/0270361 A1 | 9/2014 | Amma et al. |
| 2014/0306833 A1 | 10/2014 | Ricci |
| 2014/0307855 A1 | 10/2014 | Withagen et al. |
| 2014/0313527 A1 | 10/2014 | Askan |
| 2014/0319219 A1 | 10/2014 | Liu et al. |
| 2014/0320408 A1 | 10/2014 | Zagorsek et al. |
| 2014/0333775 A1 | 11/2014 | Naikal et al. |
| 2014/0347533 A1 | 11/2014 | Ovsiannikov et al. |
| 2014/0350710 A1 | 11/2014 | Gopalkrishnan et al. |
| 2014/0379613 A1 | 12/2014 | Nishitani et al. |
| 2015/0009100 A1 | 1/2015 | Haneda et al. |
| 2015/0009301 A1 | 1/2015 | Ribnick et al. |
| 2015/0009338 A1 | 1/2015 | Laffargue et al. |
| 2015/0036876 A1 | 2/2015 | Marrion et al. |
| 2015/0042791 A1 | 2/2015 | Metois et al. |
| 2015/0049347 A1 | 2/2015 | Laffargue et al. |
| 2015/0062369 A1 | 3/2015 | Gehring et al. |
| 2015/0063676 A1 | 3/2015 | Lloyd et al. |
| 2015/0116498 A1 | 4/2015 | Vartiainen et al. |
| 2015/0149946 A1 | 5/2015 | Benos et al. |
| 2015/0163474 A1 | 6/2015 | You |
| 2015/0178900 A1 | 6/2015 | Kim et al. |
| 2015/0201181 A1 | 7/2015 | Moore et al. |
| 2015/0204662 A1 | 7/2015 | Kobayashi et al. |
| 2015/0213647 A1 | 7/2015 | Laffargue et al. |
| 2015/0229838 A1 | 8/2015 | Hakim et al. |
| 2015/0269403 A1 | 9/2015 | Lei et al. |
| 2015/0276379 A1 | 10/2015 | Ni et al. |
| 2015/0308816 A1 | 10/2015 | Laffargue et al. |
| 2015/0316368 A1 | 11/2015 | Moench et al. |
| 2015/0325036 A1 | 11/2015 | Lee |
| 2015/0355470 A1 | 12/2015 | Herschbach |
| 2016/0048725 A1 | 2/2016 | Holz et al. |
| 2016/0070982 A1 | 2/2016 | Li et al. |
| 2016/0063429 A1 | 3/2016 | Varley et al. |
| 2016/0088287 A1 | 3/2016 | Sadi et al. |
| 2016/0090283 A1 | 3/2016 | Svensson et al. |
| 2016/0090284 A1 | 3/2016 | Svensson et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0138247 A1 | 5/2016 | Conway et al. |
| 2016/0138248 A1 | 5/2016 | Conway et al. |
| 2016/0138249 A1 | 5/2016 | Svensson et al. |
| 2016/0169665 A1 | 6/2016 | Deschenes et al. |
| 2016/0187186 A1 | 6/2016 | Coleman et al. |
| 2016/0187210 A1 | 6/2016 | Coleman et al. |
| 2016/0191801 A1 | 6/2016 | Sivan |
| 2016/0202478 A1 | 7/2016 | Masson et al. |
| 2016/0343176 A1 | 11/2016 | Ackley |

(56) References Cited

U.S. PATENT DOCUMENTS

| | | | |
|---|---|---|---|
| 2017/0115490 | A1 | 4/2017 | Hsieh et al. |
| 2017/0182942 | A1 | 6/2017 | Hardy et al. |

FOREIGN PATENT DOCUMENTS

| | | | |
|---|---|---|---|
| DE | 3335760 | A1 | 4/1985 |
| DE | 10210813 | A1 | 10/2003 |
| DE | 102007037282 | A1 | 3/2008 |
| EP | 1111435 | A2 | 6/2001 |
| EP | 1443312 | A1 | 8/2004 |
| EP | 2013117 | A1 | 1/2009 |
| EP | 2286932 | A2 | 2/2011 |
| EP | 2372648 | A2 | 10/2011 |
| EP | 2381421 | A2 | 10/2011 |
| EP | 2533009 | A1 | 12/2012 |
| EP | 2533009 | A2 | 12/2012 |
| EP | 2562715 | A1 | 2/2013 |
| EP | 2722656 | A1 | 4/2014 |
| EP | 2779027 | A1 | 9/2014 |
| EP | 2833323 | A2 | 2/2015 |
| EP | 2843590 | A1 | 3/2015 |
| EP | 2845170 | A1 | 3/2015 |
| EP | 2966595 | A1 | 1/2016 |
| EP | 3006893 | A1 | 3/2016 |
| EP | 3012601 | A1 | 3/2016 |
| EP | 3007096 | A1 | 4/2016 |
| GB | 2503978 | A | 1/2014 |
| GB | 2503978 | A1 | 1/2014 |
| GB | 2525053 | A | 10/2015 |
| GB | 2531928 | A | 5/2016 |
| JP | 104129902 | A | 4/1992 |
| JP | 200696457 | A | 4/2006 |
| JP | 2007084162 | A | 4/2007 |
| JP | 2008210276 | A | 9/2008 |
| JP | 2014210646 | A1 | 11/2014 |
| JP | 2015174705 | A | 10/2015 |
| KR | 20100020115 | A | 2/2010 |
| KR | 20110013200 | A | 2/2011 |
| KR | 20110117020 | A | 10/2011 |
| KR | 20120028109 | A | 3/2012 |
| WO | 96/40452 | A1 | 12/1996 |
| WO | 0077726 | A1 | 12/2000 |
| WO | 0114836 | A1 | 3/2001 |
| WO | 2006095110 | A1 | 9/2006 |
| WO | 2007015059 | A1 | 2/2007 |
| WO | 200712554 | A1 | 11/2007 |
| WO | 2011017241 | A1 | 2/2011 |
| WO | 2012175731 | A1 | 12/2012 |
| WO | 2013021157 | A1 | 2/2013 |
| WO | 2013033442 | A1 | 3/2013 |
| WO | 2013163789 | A1 | 11/2013 |
| WO | 2013166368 | A1 | 11/2013 |
| WO | 2013173985 | A1 | 11/2013 |
| WO | 20130184340 | A1 | 12/2013 |
| WO | 2014019130 | A1 | 2/2014 |
| WO | 2014023697 | A1 | 2/2014 |
| WO | 2014102341 | A1 | 7/2014 |
| WO | 2014149702 | A1 | 9/2014 |
| WO | 2014151746 | A1 | 9/2014 |
| WO | 2014151746 | A2 | 9/2014 |
| WO | 2015006865 | A1 | 1/2015 |
| WO | 2016020038 | A1 | 2/2016 |
| WO | 2016061699 | A1 | 4/2016 |

OTHER PUBLICATIONS

U.S. Appl. No. 13/736,139 for an Electronic Device Enclosure, filed Jan. 8, 2013 (Chaney); 40 pages.

U.S. Appl. No. 13/771,508 for an Optical Redirection Adapter, filed Feb. 20, 2013 (Anderson); 26 pages.

U.S. Appl. No. 13/780,356 for a Mobile Device Having Object Identification Interface, filed Feb. 28, 2013 (Samek et al.); 21 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

U.S. Appl. No. 13/902,144, for a System and Method for Display of Information Using a Vehicle-Mount Computer, filed May 24, 2013 (Chamberlin); 23 pages.

U.S. Appl. No. 13/902,242 for a System for Providing a Continuous Communication Link With a Symbol Reading Device, filed May 24, 2013 (Smith et al.); 24 pages.

U.S. Appl. No. 13/912,262 for a Method of Error Correction for 3D Imaging Device, filed Jun. 7, 2013 (Jovanovski et al.); 33 pages.

U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.

U.S. Appl. No. 13/927,398 for a Code Symbol Reading System Having Adaptive Autofocus, filed Jun. 26, 2013 (Todeschini); 24 pages.

U.S. Appl. No. 13/930,913 for a Mobile Device Having an Improved User Interface for Reading Code Symbols, filed Jun. 28, 2013 (Gelay et al.); 24 pages.

U.S. Appl. No. 13/933,415 for an Electronic Device Case, filed Jul. 2, 2013 (London et al.); 47 pages.

U.S. Appl. No. 13/947,296 for a System and Method for Selectively Reading Code Symbols, filed Jul. 22, 2013 (Rueblinger et al.); 29 pages.

U.S. Appl. No. 13/950,544 for a Code Symbol Reading System Having Adjustable Object Detection, filed Jul. 25, 2013 (Jiang); 28 pages.

U.S. Appl. No. 13/961,408 for a Method for Manufacturing Laser Scanners, filed Aug. 7, 2013 (Saber et al.); 26 pages.

U.S. Appl. No. 14/018,729 for a Method for Operating a Laser Scanner, filed Sep. 5, 2013 (Feng et al.); 24 pages.

U.S. Appl. No. 14/019,616 for a Device Having Light Source to Reduce Surface Pathogens, filed Sep. 6, 2013 (Todeschini); 23 pages.

U.S. Appl. No. 14/023,762 for a Handheld Indicia Reader Having Locking Endcap, filed Sep. 11, 2013 (Gannon); 31 pages.

U.S. Appl. No. 14/035,474 for Augmented-Reality Signature Capture, filed Sep. 24, 2013 (Todeschini); 33 pages.

U.S. Appl. No. 14/047,896 for Terminal Having Illumination and Exposure Control filed Oct. 7, 2013 (Jovanovski et al.); 32 pages.

U.S. Appl. No. 14/053,175 for Imaging Apparatus Having Imaging Assembly, filed Oct. 14, 2013 (Barber); 39 pages.

U.S. Appl. No. 14/055,234 for Dimensioning System, filed Oct. 16, 2013 (Fletcher); 26 pages.

U.S. Appl. No. 14/053,314 for Indicia Reader, filed Oct. 14, 2013 (Huck); 29 pages.

U.S. Appl. No. 14/065,768 for Hybrid System and Method for Reading Indicia, filed Oct. 29, 2013 (Meier et al.); 22 pages.

U.S. Appl. No. 14/074,746 for Self-Checkout Shopping System, filed Nov. 8, 2013 (Hejl et al.); 26 pages.

U.S. Appl. No. 14/074,787 for Method and System for Configuring Mobile Devices via NFC Technology, filed Nov. 8, 2013 (Smith et al.); 28 pages.

U.S. Appl. No. 14/087,190 for Optimal Range Indicators for Bar Code Validation, filed Nov. 22, 2013 (Hejl); 27 pages.

U.S. Appl. No. 14/345,735 for Optical Indicia Reading Terminal with Combined Illumination filed Mar. 19, 2014 (Ouyang); 19 pages.

U.S. Appl. No. 14/101,965 for High Dynamic-Range Indicia Reading System, filed Dec. 10, 2013 (Xian); 28 pages.

U.S. Appl. No. 14/118,400 for Indicia Decoding Device with Security Lock, filed Nov. 18, 2013 (Liu); 28 pages.

U.S. Appl. No. 14/150,393 for Incicia-reader Having Unitary Construction Scanner, filed Jan. 8, 2014 (Colavito et al.); 28 pages.

U.S. Appl. No. 14/154,207 for Laser Barcode Scanner, filed Jan. 14, 2014 (Hou et al.); 26 pages.

(56) References Cited

OTHER PUBLICATIONS

U.S. Appl. No. 14/154,915 for Laser Scanning Module Employing a Laser Scanning Assembly having Elastomeric Wheel Hinges, filed Jan. 14, 2014 (Havens et al.); 24 pages.
U.S. Appl. No. 14/158,126 for Methods and Apparatus to Change a Feature Set on Data Collection Devices, filed Jan. 17, 2014 (Berthiaume et al.); 53 pages.
U.S. Appl. No. 14/342,551 for Terminal Having Image Data Format Conversion filed Mar. 4, 2014 (Lui et al.); 25 pages.
U.S. Appl. No. 14/342,544 for Imaging Based Barcode Scanner Engine with Multiple Elements Supported on a Common Printed Circuit Board filed Mar. 4, 2014 (Liu et al.); 27 pages.
U.S. Appl. No. 14/257,174 for Reading Apparatus Having Partial Frame Operating Mode filed Apr. 21, 2014, (Barber et al.), 67 pages.
U.S. Appl. No. 14/200,405 for Indicia Reader for Size-Limited Applications filed Mar. 7, 2014 (Feng et al.); 42 pages.
U.S. Appl. No. 14/166,103 for Indicia Reading Terminal Including Optical Filter filed Jan. 28, 2014 (Lu et al.); 29 pages.
U.S. Appl. No. 14/274,858 for Mobile Printer With Optional Battery Accessory, filed May 12, 2014, (Marty et al.), 26 pages.
U.S. Appl. No. 14/264,173 for Autofocus Lens System for Indicia Readers filed Apr. 29, 2014, (Ackley et al.), 39 pages.
U.S. Appl. No. 14/230,322 for Focus Module and Components with Actuator filed Mar. 31, 2014 (Feng et al.); 92 pages.
U.S. Appl. No. 14/222,994 for Method and Apparatus for Reading Optical Indicia Using a Plurality of Data filed Mar. 24, 2014 (Smith et al.); 30 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 29/486,759 for an Imaging Terminal, filed Apr. 2, 2014 (Oberpriller et al.); 8 pages.
U.S. Appl. No. 29/436,337 for an Electronic Device, filed Nov. 5, 2012 (Fitch et al.); 19 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/459,681 for an Electronic Device Enclosure, filed Jul. 2, 2013 (Chaney et al.); 14 pages.
U.S. Appl. No. 29/459,785 for a Scanner and Charging Base, filed Jul. 3, 2013 (Fitch et al.); 21 pages.
U.S. Appl. No. 29/459,823 for a Scanner, filed Jul. 3, 2013 (Zhou et al.); 13 pages.
U.S. Appl. No. 29/468,118 for an Electronic Device Case, filed Sep. 26, 2013 (Oberpriller et al.); 44 pages.
Peter Clarke, Actuator Developer Claims Anti-Shake Breakthrough for Smartphone Cams, Electronic Engineering Times, p. 24, May 16, 2011.
U.S. Appl. No. 14/055,234, not yet published, Hand Held Products, Inc. filed Oct. 16, 2013; 26 pages.
U.S. Appl. No. 13/912,262, not yet published, filed Jun. 7, 2013, Hand Held Products Inc., Method of Error Correction for 3D Imaging Device: 33 pages.
European Search Report for application No. EP13186043 (now EP2722656 (dated Apr. 23, 2014)): Total pp. 7.
International Search Report for PCT/US2013/039438 (WO2013166368), dated Oct. 1, 2013, 7 pages.
U.S. Appl. No. 14/453,019, not yet published, filed Aug. 6, 2014, Hand Held Products Inc., Dimensioning System With Guided Alignment: 31 pages.
European Office Action for application EP 13186043, dated Jun. 12, 2014(now EP2722656 (dated Apr. 23, 2014)), Total of 6 pages.
U.S. Appl. No. 14/461,524, not yet published, filed Aug. 18, 2014, Hand Held Products Inc., System and Method for Package Dimensioning: 21 pages.
European Patent Office Action for Application No. 14157971.4-1906, dated Jul. 16, 2014, 5 pages.
European Patent Search Report for Application No. 14157971.4-1906, dated Jun. 30, 2014, 6 pages.

Caulier, Yannick et al., "A New Type of Color-Coded Light Structures for an Adapted and Rapid Determination of Point Correspondences for 3D Reconstruction." Proc. of SPIE, vol. 8082 808232-3; 2011; 8 pages.
Kazantsev, Aleksei et al. "Robust Pseudo-Random Coded Colored STructured Light Techniques for 3D Object Model Recovery"; ROSE 2008 IEEE International Workshop on Robotic and Sensors Environments (Oct. 17-18, 2008) , 6 pages.
Mouaddib E. et al. "Recent Progress in Structured Light in order to Solve the Correspondence Problem in Stereo Vision" Proceedings of the 1997 IEEE International Conference on Robotics and Automation, Apr. 1997; 7 pages.
U.S. Appl. No. 14/795,332, Frankc Laffargue et al., filed Jul. 9, 2015, not published yet, Systems and Methods for Enhancing Dimensioning; 55 pages.
U.S. Appl. No. 14/747,490, Brian L. Jovanovski et al., filed Jun. 23, 2015, not published yet, Dual-Projector Three-Dimensional Scanner; 40 pages.
U.S. Appl. No. 14/801,023, Tyler Doornenbal et al., filed Jul. 16, 2015, not published yet, Adjusting Dimensioning Results Using Augmented Reality, 39 pages.
Reisner-Kollmann,lrene; Anton L. Fuhrmann, Werner Purgathofer, Interactive Reconstruction of Industrial Sites Using Parametric Models, May 2010, Proceedings of the 26th Spring Conference of Computer Graphics SCCG 10, 8 pages.
U.S. Appl. No. 14/490,989, not yet published, filed Sep. 19, 2014, Intermec IP Corporation, Volume Dimensioning System Calibration Systems and Methods.
Wikipedia, YUV description and definition, downloaded from http://www.wikipeida.org/wiki/YUV on Jun. 29, 2012, 10 pages.
YUV Pixel Format, downloaded from http://www.fource.org/yuv.php on Jun. 29, 2012; 13 pages.
YUV to RGB Conversion, downloaded from http://www.fource.org/fccyvrgb.php on Jun. 29, 2012; 5 pages.
Benos et al., "Semi-Automatic Dimensioning with Imager of a Portable Device," U.S. Appl. No. 61/149,912, filed Feb. 4, 2009 (now expired), 56 pages.
Dimensional Weight—Wikipedia, the Free Encyclopedia, URL=http://en.wikipedia.org/wiki/Dimensional_weight, download date Aug. 1, 2008, 2 pages.
Dimensioning—Wikipedia, the Free Encyclopedia, URL=http://en.wikipedia.org/wiki/Dimensioning, download date Aug. 1, 2008, 1 page.
U.S. Appl. No. 14/519,179, Serge Thuries et al., filed Oct. 21, 2014, not published yet. 40 pages.
U.S. Appl. No. 14/519,249, H. Sprague Ackley et al., filed Oct. 21, 2014, not published yet. 36 pages.
U.S. Appl. No. 14/519,233, Franck Laffargue et al., filed Oct. 21, 2014, not published yet. 34 pages.
U.S. Appl. No. 14/519,211, H. Sprague Ackley et al., filed Oct. 21, 2014, not published yet. 33 pages.
U.S. Appl. No. 14/519,195, Franck Laffargue et al., filed Oct. 21, 2014, not published yet. 35 pages.
Second Chinese Office Action in related CN Application No. 201520810685.6, dated Mar. 22, 2016, 5 pages, no references.
European Search Report in related EP Application No. 15190315.0, dated Apr. 1, 2016, 7 pages [Commonly owned Reference 2014/0104416 has been previously cited].
Second Chinese Office Action in related CN Application No. 2015220810562.2, dated Mar. 22, 2016, 5 pages. English Translation provided [No references].
European Search Report for related Application EP 151902491, dated Mar. 22, 2016, 7 pages.
Second Chinese Office Action in related CN Application No. 201520810313.3, dated Mar. 22, 2016, 5 pages. English Translation provided [No references].
U.S. Appl. No. 14/800,757 , Eric Todeschini, filed Jul. 16, 2015, not published yet, Dimensioning and Imaging Items, 80 pages.
Proesmans, Marc et al. "Active Acquisition of 3D Shape for Moving Objects" 0-7803-3258-X/96 1996 IEEE; 4 pages.
U.S. Appl. No. 14/747,197, Serge Thuries et al., filed Jun. 23, 2015, not published yet, Optical Pattern Projector; 33 pages.

(56) References Cited

OTHER PUBLICATIONS

U.S. Appl. No. 14/747,490, Brian L Jovanovski et al., filed Jun. 23, 2015, not published yet, Dual-Projector Three-Dimensional Scanner; 40 pages.
U.S. Appl. No. 14/715,916, H. Sprague Ackley, filed May 19, 2015, not published yet, Evaluating Image Values; 54 pages.
U.S. Appl. No. 14/793,149, H. Sprague Ackley, filed Jul. 7, 2015, not published yet, Mobile Dimensioner Apparatus for Use in Commerce; 57 pages.
U.S. Appl. No. 14/740,373, H. Sprague Ackley et al., filed Jun. 16, 2015, not published yet, Calibrating a Volume Dimensioner; 63 pages.
U.S. Appl. No. 14/801,023, Tyler Doomenbal et al., filed Jul. 16, 2015, not published yet, Adjusting Dimensioning Results Using Augmented Reality, 39 pages.
Leotta, Matthew, Generic, Deformable Models for 3-D Vehicle Surveillance, May 2010, Doctoral Dissertation, Brown University, Providence RI, 248 pages.
Ward, Benjamin, Interactive 3D Reconstruction from Video, Aug. 2012, Doctoral Thesis, Univesity of Adelaide, Adelaide, South Australia, 157 pages.
Hood, Frederick W.; William A. Hoff, Robert King, Evaluation of an Interactive Technique for Creating Site Models from Range Data, Apr. 27-May 1, 1997 Proceedings of the ANS 7th Topical Meeting on Robotics & Remote Systems, Augusta GA, 9 pages.
Gupta, Alok; Range Image Segmentation for 3-D Objects Recognition, May 1988, Technical Reports (CIS), Paper 736, University of Pennsylvania Department of Computer and Information Science, retrieved from Http://repository.upenn.edu/cis_reports/736, Accessed May 31, 2015, 157 pages.
Reisner-Kollmann, Irene; Anton L. Fuhrmann, Werner Purgathofer, Interactive Reconstruction of Industrial Sites Using Parametric Models, May 2010, Proceedings of the 26th Spring Conference of Computer Graphics SCCG 10, 8 pages.
Drummond, Tom; Roberto Cipolla, Real-Time Visual Tracking of Complex Structures, Jul. 2002, IEEE Transactions on Pattern Analysis and Machine Intelligence, vol. 24, No. 7; 15 pages.
Zhang, Zhaoxiang; Tieniu Tan, Kaiqi Huang, Yunhong Wang; Three-Dimensional Deformable-Model-based Localization and Recognition of Road Vehicles; IEEE Transactions on Image Processing, vol. 21, No. 1, Jan. 2012, 13 pages.
Leotta, Matthew J.; Joseph L. Mundy; Predicting High Resolution Image Edges with a Generic, Adaptive, 3-D Vehicle Model; IEEE Conference on Computer Vision and Pattern Recognition, 2009; 8 pages.
Spiller, Jonathan; Object Localization Using Deformable Templates, Master's Dissertation, University of the Witwatersrand, Johannesburg, South Africa, 2007; 74 pages.
EP Search and Written Opinion Report in related matter EP Application No. 14181437.6, dated Mar. 26, 2015, 7 pages.
Hetzel, Gunter et al.; "3D Object Recognition from Range Images using Local Feature Histograms,", Proceedings 2001 IEEE Conference on Computer Vision and Pattern Recognition. CVPR 2001. Kauai, Hawaii, Dec. 8-14, 2001; pp. 394-399, XP010584149, ISBN: 978-0-7695-1272-3.
Intention to Grant in counterpart European Application No. 14157971.4 dated Apr. 14, 2015, pp. 1-8.
Decision to Grant in counterpart European Application No. 14157971.4 dated Aug. 6, 2015, pp. 1-2.
Salvi, Joaquim et al. "Pattern Codification Strategies in Structured Light Systems" published in Pattern Recognition; The Journal of the Pattern Recognition Society, Received Mar. 6, 2003; Accepted Oct. 2, 2003; 23 pages.
James Chamberlin, "System and Method for Picking Validation", U.S. Appl. No. 14/865,797, filed Sep. 25, 2015, 44 pages, not yet published.
Jovanovski et al., "Image-Stitching for Dimensioning", U.S. Appl. No. 14/870,488, filed Sep. 30, 2015, 45 pages, not yet published.

Todeschini et al.; "Depth Sensor Based Auto-Focus System for an Indicia Scanner," U.S. Appl. No. 14/872,176, filed Oct. 1, 2015, 44 pages, not yet published.
McCloskey et al., "Methods for Improving the Accuracy of Dimensioning-System Measurements," U.S. Appl. No. 14/873,613, filed Sep. 2, 2015, 47 pages, not yet published.
McCloskey et al., "Image Transformation for Indicia Reading," U.S. Appl. No. 14/982,032, filed Oct. 30, 2015, 48 pages, not yet published.
Search Report and Opinion in related GB Application No. 1517112.7, dated Feb. 19, 2016, 6 Pages (GB2503978 is a commonly owned now abandoned application).
United Kingdom combined Search and Examination Report in related GB Application No. 1607394.2, dated Oct. 19, 2016, 7 pages.
European Search Report from related EP Application No. 16168216.6, dated Oct. 20, 2016, 8 pages.
European Extended Search Report in related EP Application No. 16173429.8, dated Dec. 1, 2016, 8 pages.
Lloyd, Ryan and Scott McCloskey, "Recognition of 3D Package Shapes for Singe Camera Metrology" IEEE Winter Conference on Applications of computer Visiona, IEEE, Mar. 24, 2014, pp. 99-106, {retrieved on Jun. 16, 2014}, Authors are employees of common Applicant.
European Search Report for Related EP Application No. 15189214.8, dated Mar. 3, 2016, 9 pages.
Santolaria et al. "A one-step intrinsic and extrinsic calibration method for laster line scanner operation in coordinate measuring machines", dated Apr. 1, 2009, Measurement Science and Technology, IOP, Bristol, GB, vol. 20, No. 4; 12 pages.
Search Report and Opinion in Related EP Application 15176943.7, dated Jan. 8, 2016, 8 pages.
European Search Report for related EP Application No. 15188440.0, dated Mar. 8, 2016, 8 pages.
United Kingdom Search Report in related application GB1517842.9, dated Apr. 8, 2016, 8 pages.
Great Britain Search Report for related Application On. GB1517843.7, dated Feb. 23, 2016; 8 pages.
Extended European Search Report in related EP Application No. 16175410.0, dated Dec. 13, 2016, 5 pages.
Office Action in counterpart European Application No. 13186043.9 dated Sep. 30, 2015, pp. 1-7.
Lloyd et al., "System for Monitoring the Condition of Packages Throughout Transit", U.S. Appl. No. 14/865,575, filed Sep. 25, 2015, 59 pages, not yet published.
McCloskey et al., "Image Transformation for Indicia Reading," U.S. Appl. No. 14/928,032, filed Oct. 30, 2015, 48 pages, not yet published.
Great Britain Combined Search and Examination Report in related Application GB1517842.9, dated Apr. 8, 2016, 8 pages.
Search Report in counterpart European Application No. 15182675.7, dated Dec. 4, 2015, 10 pages.
Wikipedia, "3D projection" Downloaded on Nov. 25, 2015 from www.wikipedia.com, 4 pages.
M.Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134.
European Extended Search Report in Related EP Application No. 16172995.9, dated Aug. 22, 2016, 11 pages.
European Extended search report in related EP Application No. 15190306.9, dated Sep. 9, 2016, 15 pages.
Collings et al., "The Applications and Technology of Phase-Only Liquid Crystal on Silicon Devices", Journal of Display Technology, IEEE Service Center, New York, NY, US, vol. 7, No. 3, Mar. 1, 2011 (Mar. 1, 2011), pp. 112-119.
European extended Search report in related EP Application 13785171.3, dated Sep. 19, 2016, 8 pages.
El-Hakim et al., "Multicamera vision-based approach to flexible feature measurement for inspection and reverse engineering", published in Optical Engineering, Society of Photo-Optical Instrumentation Engineers, vol. 32, No. 9, Sep. 1, 1993, 15 pages.

(56) References Cited

OTHER PUBLICATIONS

El-Hakim et al., "A Knowledge-based Edge/Object Measurement Technique", Retrieved from the Internet: URL: https://www.researchgate.net/profile/Sabry_El-Hakim/publication/44075058_A_Knowledge_Based_EdgeObject_Measurement_Technique/links/00b4953b5faa7d3304000000.pdf [retrieved on Jul. 15, 2016] dated Jan. 1, 1993, 9 pages.

H. Sprague Ackley, "Automatic Mode Switching in a Volume Dimensioner", U.S. Appl. No. 15/182,636, filed Jun. 15, 2016, 53 pages, Not yet published.

Bosch Tool Corporation, "Operating/Safety Instruction for DLR 130", Dated Feb. 2, 2009, 36 pages.

European Search Report for related EP Application No. 16152477.2, dated May 24, 2016, 8 pages.

Mike Stensvold, "get the Most Out of Variable Aperture Lenses", published on www.OutdoorPhotogrpaher.com; dated Dec. 7, 2010; 4 pages, [As noted on search report retrieved from URL: http://www.outdoorphotographer.com/gear/lenses/get-the-most-out-ofvariable-aperture-lenses.html on Feb. 9, 2016].

Padzensky, Ron; "Augmera; Gesture Control", Dated Apr. 18, 2015, 15 pages [Examiner Cited Art in Office Action dated Jan. 20, 2017 in related Application.].

Grabowski, Ralph; "New Commands in AutoCADS 2010: Part 11 Smoothing 3D Mesh Objects" Dated 2011 (per examiner who cited reference), 6 pages, [Examiner Cited Art in Office Action dated Jan. 20, 2017 in related Application.].

Theodoropoulos, Gabriel; "Using Gesture Recognizers to Handle Pinch, Rotate, Pan, Swipe, and Tap Gestures" dated Aug. 25, 2014, 34 pages, [Examiner Cited Art in Office Action dated Jan. 20, 2017 in related Application.].

European Exam Report in related EP Application No. 15176943.7, dated Apr. 12, 2017, 6 pages.

European Exam Report in related EP Application No. 15188440.0, dated Apr. 21, 2017, 4 pages.

European extended search report in related EP Application 16190833.0, dated Mar. 9, 2017, 8 pages.

United Kingdom Combined Search and Examination Report in related Application No. GB1620676.5, dated Mar. 8, 2017, 6 pages.

European Exam Report in related , EP Application No. 16168216.6, dated Feb. 27, 2017, 5 pages.

European Extended Search Report in related EP Application No. 16190017.0, dated Jan. 4, 2017, 6 pages.

Ralph Grabowski, "Smothing 3D Mesh Objects," New Commands in AutoCAD 2010: Part 11, Examiner Cited art in related matter Non Final Office Action dated May 19, 2017; 6 pages.

Chinese Notice of Reexamination in related Chinese Application 201520810313.3, dated Mar. 14, 2017, English computer Translation provided, 7 pages.

Extended European search report in related EP Application 16199707.7, dated Apr. 10, 2017, 15 pages.

Ulusoy et al., One-Shot Scanning using De Bruijn Spaced Grids, 2009 IEEE 12th International Conference on Computer Vision Workshops, ICCV Workshops, 7 pages. [Cited in EP Extended search report dated Apr. 10, 2017].

Thorlabs, Examiner Cited NPL in Advisory Action dated Apr. 12, 2017 in related commonly owned application, downloaded from https://www.thorlabs.com/newgrouppage9.cfm?objectgroup_id=6430, 4 pages.

EKSMA Optics, Examiner Cited NPL in Advisory Action dated Apr. 12, 2017 in related commonly owned application, downloaded from http://eksmaoptics.com/optical-systems/f-theta-lenses/f-theta-lens-for-1064-nm/, 2 pages.

Sill Optics, Examiner Cited NPL in Advisory Action dated Apr. 12, 2017 in related commonly owned application, http://www.silloptics.de/1/products/sill-encyclopedia/laser-optics/f-theta-lenses/, 4 pages.

Wikipedia, "Microlens", Downloaded from https://en.wikipedia.org/wiki/Microlens, pp. 3. {Cited by Examiner in Feb. 9, 2017 Final Office Action in related matter}.

Fukaya et al., "Characteristics of Speckle Random Pattern and Its Applications", pp. 317-327, Nouv. Rev. Optique, t.6, n.6. (1975) {Cited by Examiner in Feb. 9, 2017 Final Office Action in related matter: downloaded Mar. 2, 2017 from http://iopscience.iop.org}.

European Examination report in related EP Application No. 14181437.6, dated Feb. 8, 2017, 5 pages.

European Exam Report in related EP Application No. 16152477.2, dated Jun. 20, 2017, 4 pages.

European Exam Report in related EP Applciation 16172995.9, dated Jul. 6, 2017, 9 pages.

United Kingdom Search Report in related Application No. GB1700338.5, dated Jun. 30, 2017, 5 pages.

European Search Report in related EP Application No. 17175357.7, dated Aug. 17, 2017, pp. 1-7.

Boavida et al., "Dam monitoring using combined terrestrial imaging systems", 2009 Civil Engineering Survey Dec/Jan. 2009, pp. 33-38.

EP Search Report in related EP Application No. 17171844 dated Sep. 18, 2017. 4 pages {Only new art cited herein}.

EP Extended Search Report in related EP Applicaton No. 17174843.7 dated Oct. 17, 2017, 5 pages. {Only new art cited herein}.

UK Further Exam Report in related UK Application No. GB1517842.9, dated Sep. 1, 2017, 5 pages (only new art cited herein).

Ulusoy, Ali Osman et al.; "One-Shot Scanning using De Bruijn Spaced Grids", Brown University; 2009 IEEE 12th International Conference on Computer Vision Workshops, ICCV Workshops, pp. 1786-1792.

Extended European Search report in related EP Application No. 17189496.7 dated Dec. 5, 2017; 9 pages.

\* cited by examiner

US 9,880,268 B2

METHOD OF ERROR CORRECTION FOR 3D IMAGING DEVICE

FIELD OF THE INVENTION

The disclosure relates generally to imaging devices, and, more particularly, to a method of error correction for an imaging device.

BACKGROUND OF THE DISCLOSURE

Many commercial and research sectors have a need for rapid three-dimensional (3D) measurements of objects. Recently, 3D range cameras (e.g., laser range cameras (LRC), range imaging cameras, range cameras, 3D cameras, time-of-flight cameras, ToF cameras) have gained in popularity due to certain advantages over other types of 3D dimensioning systems such as laser scanners (e.g., LIDAR), and due to advances in technology making the use of 3D range cameras more practical. Range imaging cameras resolve distance based on the known speed of light using a time-of-flight technique. An illumination unit such as a laser or LED array illuminates the field of view. The reflected light is gathered by optics onto an image sensor (e.g., CCD, CMOS). Each collector (e.g., pixel) of the image sensor simultaneously measures the time that it took for the light to travel from the illumination unit to the target object and back to the range imaging camera.

A principal advantage of range imaging cameras is that they are typically able to resolve distances much quicker than laser scanning systems such as LIDAR. Their speed is principally attributable to the fact that the range imaging camera calculates distances to each point in parallel, whereas laser scanning techniques measure distances point by point as the laser passes over the entire target object. Because each pixel detects the distance to its corresponding point on the target object simultaneously, the range imaging camera is able to capture complete images very quickly (e.g., about 100 frames per second). The high-speed nature of range imaging cameras makes them well-suited for real-time applications. For example, range imaging cameras have been used experimentally to control driverless automobiles, and are used to enable certain robotic devices to maneuver through their environment. Another advantage enjoyed by range imaging cameras is that they afford greater simplicity and durability due to their lack of moving parts. In contrast, laser scanning devices typically employ a rotatable mirror to sweep the laser across the target object. Range imaging cameras also tend to be less expensive.

Although there is tremendous potential for range imaging devices in a variety of commercial and research sectors, there remain challenges to the reliability, and therefore usability, of the technology. For example, external factors that interfere with the detection of light reflected back to the range imaging camera can contribute to errors in distance measurement. Background light (e.g., ambient light) can reach the pixels, thereby increasing the signal-to-noise ratio and diminishing the ability of the pixel to obtain an accurate determination of the light beam's travel time. Similarly, interference problems can result when multiple range imaging cameras are in use at the same time, which can lead to one camera detecting the reflected signal generated by the other camera. Other sources of distance detection error for these types of systems may include pixel saturation, mixed pixels, motion artifacts, and internal scattering (e.g., internal reflections of the received signal between the gathering lens and image sensor). Systemic distance measurement errors can result in greatly reduced distance measuring accuracy (e.g., errors of up to tens of centimeters).

Range image cameras are not the only types of dimension imaging devices susceptible to errors in measurement. The aforementioned laser scanners can also experience errors that bring their measurements outside of accepted tolerances. Because the error correction techniques discussed herein could be applied to any of the various types of dimensioning cameras, the term "3D scanner," as it is used in this disclosure, is intended to broadly encompass any type of imaging device adapted to measure the dimensions of an object, including range image cameras, laser range cameras (LRC), range imaging cameras, range cameras, 3D cameras, time-of-flight cameras, ToF cameras, Lidar, stereo imaging cameras, and triangulation range finders.

Therefore, there exists a need for a method of correcting measurement errors in a 3D scanner.

SUMMARY OF THE INVENTION

In one aspect, the present disclosure embraces a method of error correction for a 3D scanner. A plurality of calibration objects, each having a known height, are provided, along with a 3D scanner having a field of view. At least a portion of the field of view is divided into a plurality of sectors. The 3D scanner is used to scan each of the plurality of calibration objects, in successive fashion, in each of the plurality of sectors to obtain for each of the plurality of calibration objects a measured height corresponding to each of the plurality of sectors. A height measurement error for each of the plurality of sectors is calculated based on the known height of each calibration object and the measured height of each calibration object in each of the plurality of sectors. When scanning a target object positioned in a sector, a corrected height measurement of the target object is calculated from the measured height of the target object and the height measurement error corresponding to the sector. In one embodiment, the calculated height measurement error for each of the plurality of sectors may be stored in a memory store (e.g., a computer memory or computer hard drive).

In one embodiment wherein each of the plurality of calibration objects has a known width, each of the plurality of calibration objects, in successive fashion, are scanned with the 3D scanner in each of the plurality of sectors to obtain for each of the plurality of calibration objects a measured width corresponding to each of the plurality of sectors. A width measurement error for each of the plurality of sectors is calculated based on the known width of each calibration object and the measured width of each calibration object in each of the plurality of sectors. When scanning a target object positioned in a sector, a corrected width measurement of the target object is calculated from the measured width of the target object and the width measurement error corresponding to the sector.

In another embodiment wherein each of the plurality of calibration objects has a known length, each of the plurality of calibration objects, in successive fashion, are scanned with the 3D scanner in each of the plurality of sectors to obtain for each of the plurality of calibration objects a measured length corresponding to each of the plurality of sectors. A length measurement error for each of the plurality of sectors is calculated based on the known length of each calibration object and the measured length of each calibration object in each of the plurality of sectors. When scanning a target object positioned in a sector, a corrected length measurement of the target object is calculated from the measured length of the target object and the length measurement error corresponding to the sector.

In another aspect, the present disclosure embraces a method of error correction for a 3D scanner where a plurality of calibration objects, each having a known height, known width, and known length, are provided, along with a 3D scanner having a field of view. At least a portion of the field of view is divided into a plurality of sectors. Each of the plurality of calibration objects is scanned, in successive fashion, in each of the plurality of sectors with the 3D scanner to obtain for each of the plurality of calibration objects a measured height, a measured width, and a measured length corresponding to each of the plurality of sectors. A height measurement error for each of the plurality of sectors is calculated based on the known height of each calibration object and the measured height of each calibration object in each of the plurality of sectors. A width measurement error for each of the plurality of sectors is calculated based on the known width of each calibration object and the measured width of each calibration object in each of the plurality of sectors. A length measurement error for each of the plurality of sectors is calculated based on the known length of each calibration object and the measured length of each calibration object in each of the plurality of sectors. When scanning a target object positioned in a sector, a corrected height measurement of the target object is calculated from the measured height of the target object and the height measurement error corresponding to the sector; and a corrected width measurement of the target object is calculated from the measured width of the target object and the width measurement error corresponding to the sector; and a corrected length measurement of the target object is calculated from the measured length of the target object and the length measurement error corresponding to the sector.

In another aspect, the disclosure embraces a method of error correction for a 3D scanner where a plurality of calibration objects, each having a first known dimension, are provided, along with a 3D scanner having a field of view. At least a portion of the field of view is divided into a plurality of sectors. Each of the plurality of calibration objects is scanned, in successive fashion, with the 3D scanner in each of the plurality of sectors to obtain for each of the plurality of calibration objects a first measured dimension corresponding to each of the plurality of sectors. For each sector, a first dimension measurement error for each calibration object is calculated based on the first known dimension of the calibration object and the first measured dimension of the calibration object in the sector. For each sector, it is determined if the first dimension error for each calibration object is substantially the same. For each sector, if the first dimension measurement error for each calibration object is substantially the same, the first dimension measurement error is stored. When scanning a target object positioned in a sector, a corrected first dimension measurement of the target object is calculated from the first measured dimension of the target object and the stored first dimension measurement error corresponding to the sector.

In one embodiment in which each calibration object has a second known dimension orthogonal to the first known dimension, each of the plurality of calibration objects is scanned with the 3D scanner, in successive fashion, in each of the plurality of sectors to obtain for each of the plurality of calibration objects a second measured dimension corresponding to each of the plurality of sectors. For each sector, a second dimension measurement for each calibration object is calculated based on the second known dimension of the calibration object and the second measured dimension of the calibration object in the sector. For each sector, it is determined if the second dimension measurement error for each calibration object is substantially the same. For each sector, if the second dimension measurement error for each calibration object is substantially the same, the second dimension measurement error is stored. When scanning a target object positioned in a sector, a corrected second dimension measurement of the target object is calculated from the second measured dimension of the target object and the stored second dimension measurement error corresponding to the sector.

In one embodiment in which each calibration object has a second known dimension orthogonal to the first known dimension and a third known dimension orthogonal to the first known dimension and the second known dimension, each of the plurality of calibration objects is scanned with the 3D scanner, in successive fashion, in each of the plurality of sectors to obtain for each of the plurality of calibration objects a third measured dimension corresponding to each of the plurality of sectors. For each sector, a third dimension measurement for each calibration object is calculated based on the third known dimension of the calibration object and the third measured dimension of the calibration object in the sector. For each sector, it is determined if the third dimension measurement error for each calibration object is substantially the same. For each sector, if the third dimension measurement error for each calibration object is substantially the same, the third dimension measurement error is stored. When scanning a target object positioned in a sector, a corrected third dimension measurement of the target object is calculated from the third measured dimension of the target object and the stored third dimension measurement error corresponding to the sector.

DETAILED DESCRIPTION

Figure 1:
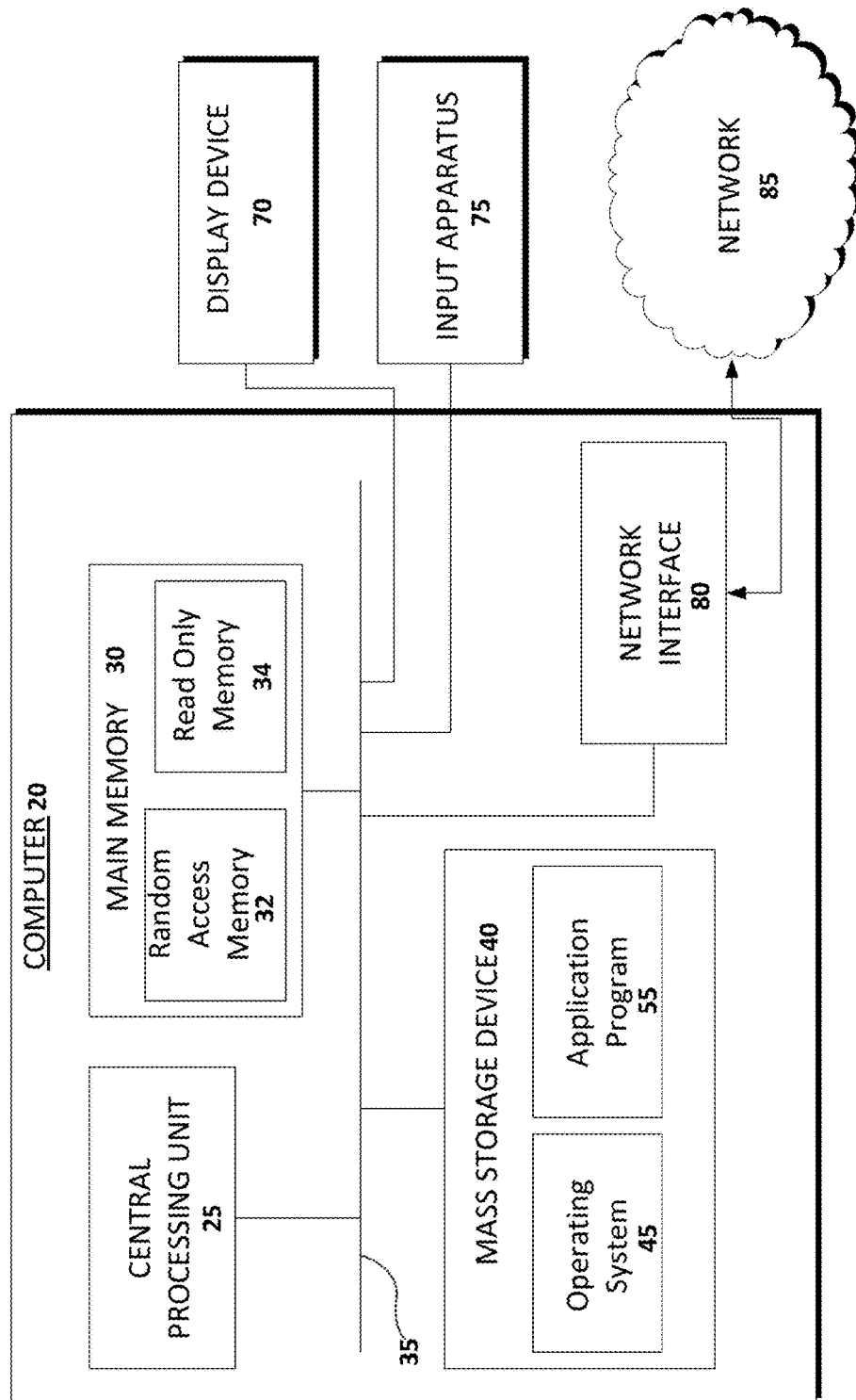
FIG. 1 is schematic block diagram of an exemplary computer used in an exemplary method according to the present disclosure.

Turning now to the drawings, FIG. 1 is a schematic block diagram of an exemplary computer 20 used in an exemplary method according to the present disclosure. The computer 20 is used to calculate and compile errors in measurement by the 3D scanner, and to apply error correction calculations, as appropriate, to measurements received by the computer 20 from the 3D scanner. The computer 20 includes a mass storage device 40 for storing an operating system 45 and application programs 55. The mass storage device 40 may store other types of information. The operating system 45 is software that controls the overall operation of the computer 20, including process scheduling and management, process protection, and memory management. Examples of a suitable operating system include, without limitation, WINDOWS® 7 from MICROSOFT® CORPORATION of Redmond, Wash., and the LINUX® open source operating system. Typically, the operating system 45 is loaded by booting the computer 20 and is executed directly by the central processing unit 25. An application program 55 is an executable software program designed to perform specific tasks. The application programs 55 may load automatically upon execution of the operating system 45 or in response to a command input.

A main memory 30 provides for storage of instructions and data directly accessible by the central processing unit 25. Main memory 30 may include random-access memory 32 (RAM) and read-only memory 34 (ROM). The ROM 34 may permanently store firmware or a basic input/output system (BIOS), which provide the first instructions to the computer 20 when it boots up. The RAM 32 typically serves as temporary and immediately accessible storage for the operating system 45 and application programs 55.

The mass storage device 40 may be any of the various types of computer components capable of storing large amounts of data in a persisting (i.e., non-volatile) and machine-readable manner. Typically, the mass storage device 40 will be a hard disk drive. Alternatively, the mass storage device 40 may be a solid state drive, optical drive, or other component with similar storage capabilities.

An exemplary embodiment of the computer 20 used to practice the method according to the present disclosure also includes a network interface 80. Typically, the network interface 80 is connected to a network 85, thereby enabling the computer 20 to communicate with the network 85. The network 85 may be any collection of computers or communication devices interconnected by communication channels. The communication channels may be wired or wireless. Examples of such communication networks include, without limitation, local area networks, the Internet, and cellular networks. The connection to the communications network 85 allows the computer 20 to communicate with other network nodes.

The computer 20 receives user input (i.e., user commands) via an input apparatus 75. The type of input apparatus 75 employed by the computer 20 will generally depend upon the input requirements of the application programs 55 (e.g., whether they require data input or simply menu selection). Examples of a suitable input apparatus 75 include, without limitation, a keyboard, a mouse, a light pen, a microphone, a touchpad, or a touchscreen. An input apparatus 75 may include a plurality of input devices (e.g., a mouse, a keyboard, and a 3D scanner). Where data input is required, a keyboard would typically be the preferred input apparatus 75. Where touchscreen input is desirable, the input apparatus 75 may be integrated with the display device 70.

The central processing unit 25, main memory 30, mass storage device 40, network interface 80, display device 70, and input apparatus 75 are all operably connected to a system bus 35. The system bus 35 is adapted to transmit data communications between components of the computer 20 (e.g., between the central processing unit 25 and the network interface 80).

Figure 2:
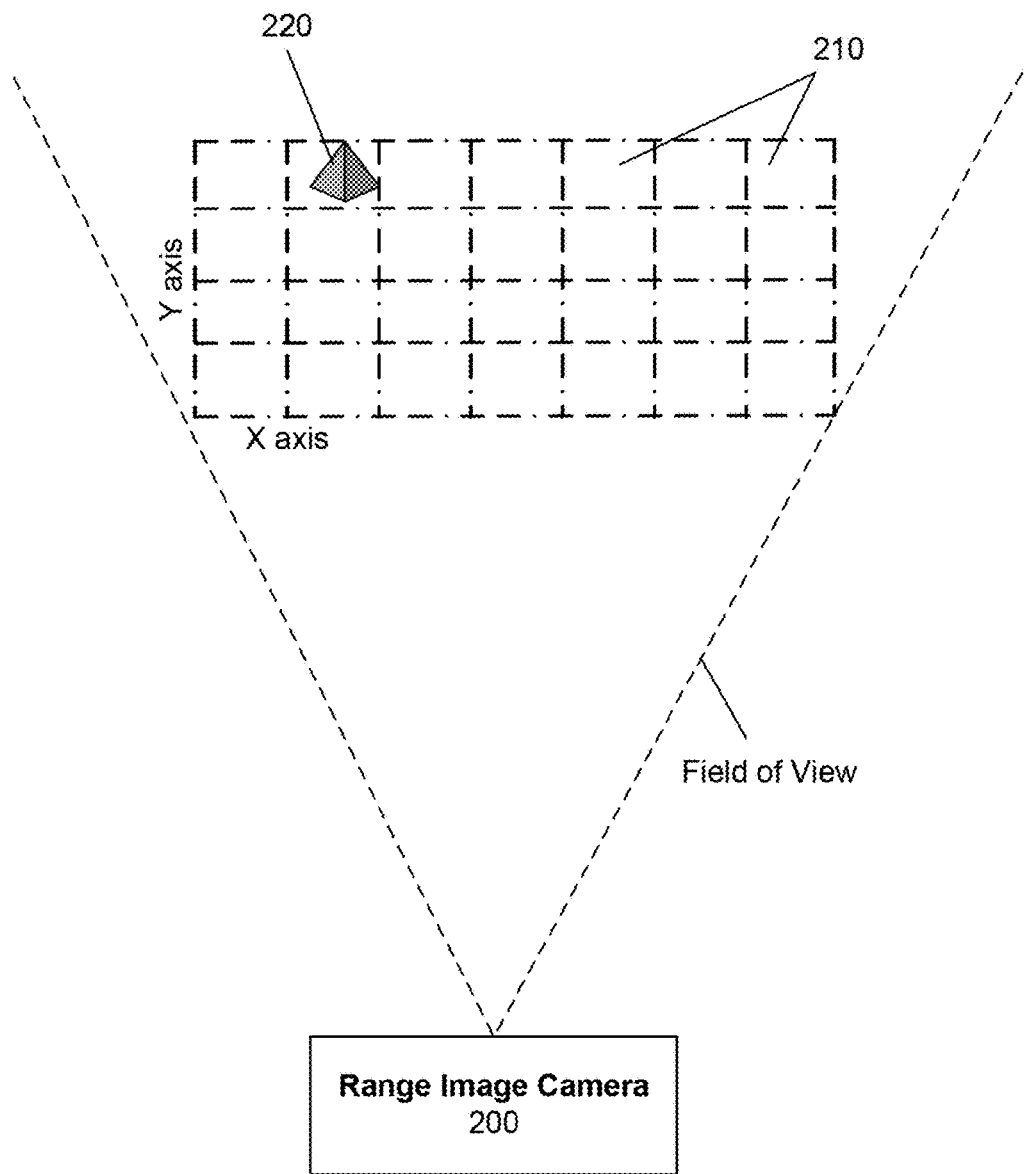
FIG. 2 is a top elevational depiction of a calibration object within one of a plurality of sectors within the field of view of an exemplary 3D scanner used in an exemplary method according to the present disclosure.
Figure 3:
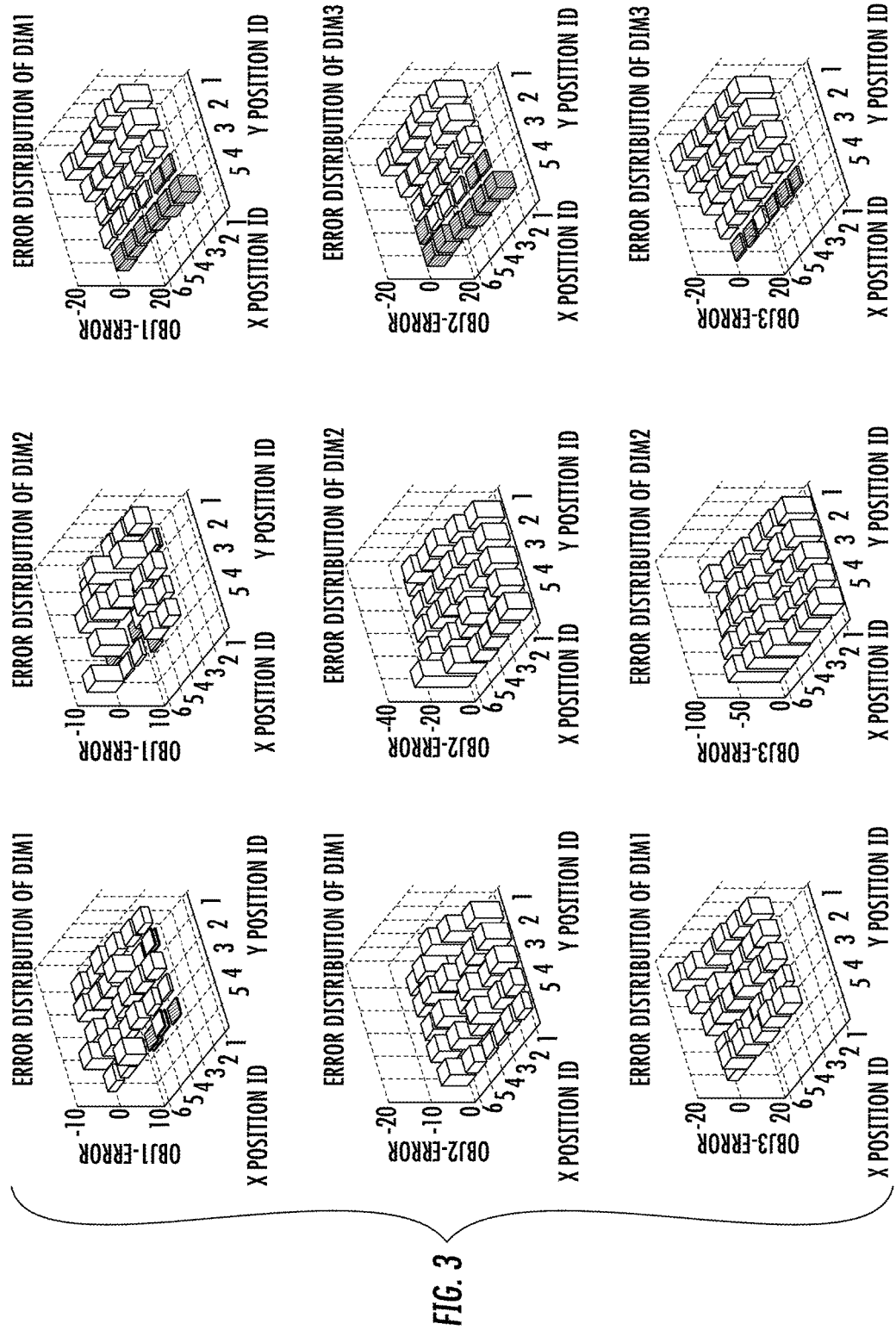
FIG. 3 is an exemplary collection of graphical representations of measurement errors in a 3D scanner as detected by an exemplary method according to the present disclosure.

Reference is now made to FIGS. 2 and 3. The method employs a plurality of calibration objects 220. The calibration objects 220 have a known height, a known width, and a known length (i.e., known dimensions). The dimensions of the calibration objects 220 can be predetermined by any conventional measurement technique (e.g., ruler, tape measure). In this way, the calibration object 220 is used as a standard for comparison to the measurements obtained from the unit under test, the range image camera 200. The dimensions of the calibration objects 220 may become known, through the traditional measuring techniques or other suitable method, either before or after the taking of measurement readings by the 3D scanner. A calibration object 220 may be any object of suitable size and shape to be scanned by the particular 3D scanner being employed. Typically, a calibration object 220 will be of a kind similar to the types of objects normally measured by the particular 3D scanner when in regular use. For example, if the 3D scanner typically is used to measure shipping boxes, typical calibration objects 220 would include shipping boxes. Typically, the calibration objects 220 will be of varying shape and size. Varying the shape and size of the calibration object 220 used during each calibration scan will help ensure that repeatable measurement errors are not attributable to a specific shape or size of the scanned object. In other words, using calibration objects 220 of varying sizes and shapes helps to eliminate object size and/or shape as a variable that could be contributing to the measurement error on a given scan.

Each of the plurality of calibration objects 220 are scanned separately (e.g., in successive fashion). Prior to scanning the calibration objects, at least a portion of the field of view of the 3D scanner is divided into a plurality of sectors 210. Typically, the sectors 210 are defined by a grid of uniformly spaced horizontal and perpendicular lines, with each sector 210 being uniquely identifiable by a pair of coordinates (x,y). Typically, the grid is on a horizontal plane. More typically, the grid is on the ground plane (e.g., the supporting surface of the measured objects). Each of the plurality of calibration objects 220 are scanned by the 3D scanner at each of the sectors (e.g., one scan in each of sectors $x_1,y_1$ to $x_n,y_n$). The result of the scans is a measured height, a measured width, and a measured length for each calibration object 220 at each of the plurality of sectors. These measured dimensions represent the dimensions as calculated by the 3D scanner, which measured dimensions may or may not be accurate. For example, the first calibration object 220 will have a measured height, a measured width, and a measured length at each of sectors 210 $(x_1,y_1)$, $(x_2,y_2)$ through $(x_n,y_n)$. It will be appreciated by persons of ordinary skill in the art that it is not necessary to scan the calibration object 220 in all dimensions (e.g., height, width, and length) if an analysis of fewer than all the dimensions would be sufficient. For example, the height dimension may be important for obtaining an accurate 3D scan; so it may be desirable to only obtain a measured height for each of the calibration objects 220.

Having acquired these measurements with the 3D scanner 200, the recorded measurements are then compared to the known measurements of the calibration objects 220. For a given sector, the comparison results in a measurement error for each of the dimensions (e.g., a height measurement error, a width measurement error, and a length measurement error). A measurement error is the amount by which the measured dimension of the calibration object 220 varies from the corresponding known dimension of the calibration object 220. For example, the first calibration object 220 that is scanned will have a measured height for sector (x1,y1). The difference between the measured height and the known height is that first calibration object's 220 height measurement error for sector (x1,y1). Typically, the calculations of measurement error are performed by the computer 220 using an application program 55 adapted to perform such calculations. FIG. 3 shows an exemplary display generated by an exemplary application program 55 adapted to calculate measurement error. In FIG. 3, there are three rows of charts, with each row depicting data relating to a different calibration object 220. Each of the three columns depicts data relating to one of the three dimensions of height, width, and length. Each bar on the chart represents the calculated measurement error for the corresponding sector 210.

It will be appreciated by persons of ordinary skill in the art that the charts in FIG. 3 reflect that measurement errors were calculated in most of the scanned sectors 210 for each of the calibration objects 220. In other words, every scan typically results in some degree of measurement error, regardless of the calibration object 220 employed or the sector 210 scanned. This is largely attributable to random errors encountered for reasons such as interference. Because these types of random errors are, by definition, not predictable, they cannot be corrected for. The method according to the present disclosure seeks to identify those systemic errors that repeat themselves scan over scan. To identify these systemic errors, it is necessary to analyze the measurement errors to determine which sectors are experiencing about the same level of measurement error (e.g., consistent measurement error) in scans of each calibration object 220. For example, in FIG. 3, the third column shows measurements in the same dimension for three different calibration objects 220. The chart reveals that scans taken on the left side of the field of view tended to have about the same levels of measurement error. As such, the measurement errors in these sectors 210 should be identified using the computer 20 as systemic errors which should be corrected.

To correct the measurement error in a given sector 210, the computer calculates an estimated measurement error for that sector 210. The estimated measurement error is typically calculated based upon an analysis of all the measurement errors (i.e., for different calibration objects) for a given sector 210. The estimated measurement error may be calculated by a variety of methods, including by taking the average of the measurement errors or by taking the mean measurement error. Once an estimated measurement error is determined by the computer 20, the estimated measurement error for each sector 210 is stored in the computer 20 (e.g., in memory or hard drive). In this way, the estimated measurement error can be recalled each time the computer 20 processes a scan of an object located in that sector 210.

The estimated measurement error data is used whenever the 3D scanner is used to measure target objects. Target objects are objects about which the user of the 3D scanner wishes to determine their dimensions. In other words, target objects are objects that are scanned by the 3D scanner that are not calibration objects 220. When the 3D scanner scans a target object, it determines in what sector the target object was positioned. When the measurement readings for the target object are received by the computer 20, the computer 20 applies the estimated measurement error for that sector 210 to the actual measurements for each dimension. In other words, the computer 20 uses the estimated measurement error stored in memory to correct (e.g., by error regression) the 3D scanner's measurements of the target object. In this way, each subsequent scan of a target object is made more accurate by accounting for systemic (e.g., repeated) errors experienced by the 3D scanner. The result is a more accurate dimensional scan which is more likely to fall within acceptable scan tolerances (e.g., scans accurate to within less than one millimeter).

Exemplary methods of determining the dimensions of an object are disclosed in U.S. patent application Ser. No. 13/784,933 for an Integrated Dimensioning and Weighing System, filed Mar. 5, 2013 (McCloskey et al.) and U.S. patent application Ser. No. 13/785,177 for a Dimensioning System, filed Mar. 5, 2013 (McCloskey et al.), each of which is hereby incorporated by reference in its entirety.

To supplement the present disclosure, this application incorporates entirely by reference the following patents, patent application publications, and patent applications: U.S. Pat. No. 6,832,725; U.S. Pat. No. 7,159,783; U.S. Pat. No. 7,413,127; U.S. Pat. No. 8,390,909; U.S. Pat. No. 8,294,969; U.S. Pat. No. 8,408,469; U.S. Pat. No. 8,408,468; U.S. Pat. No. 8,381,979; U.S. Pat. No. 8,408,464; U.S. Pat. No. 8,317,105; U.S. Pat. No. 8,366,005; U.S. Pat. No. 8,424,768; U.S. Pat. No. 8,322,622; U.S. Pat. No. 8,371,507; U.S. Pat. No. 8,376,233; U.S. Pat. No. 8,457,013; U.S. Pat. No. 8,448,863; U.S. Pat. No. 8,459,557; U.S. Patent Application Publication No. 2012/0111946; U.S. Patent Application Publication No. 2012/0223141; U.S. Patent Application Publication No. 2012/0193423; U.S. Patent Application Publication No. 2012/0203647; U.S. Patent Application Publication No. 2012/0248188; U.S. Patent Application Publication No. 2012/0228382; U.S. Patent Application Publication No. 2012/0193407; U.S. Patent Application Publication No. 2012/0168511; U.S. Patent Application Publication No. 2012/0168512; U.S. Patent Application Publication No. 2010/0177749; U.S. Patent Application Publication No. 2010/0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0225757; U.S. patent application Ser. No. 13/347,219 for an OMNIDIRECTIONAL LASER SCANNING BAR CODE SYMBOL READER GENERATING A LASER SCANNING PATTERN WITH A HIGHLY NON-UNIFORM SCAN DENSITY WITH RESPECT TO LINE ORIENTATION, filed Jan. 10, 2012 (Good); U.S. patent application Ser. No. 13/347,193 for a HYBRID-TYPE BIOPTICAL LASER SCANNING AND DIGITAL IMAGING SYSTEM EMPLOYING DIGITAL IMAGER WITH FIELD OF VIEW OVERLAPPING FIELD OF FIELD OF LASER SCANNING SUBSYSTEM, filed Jan. 10, 2012 (Kearney et al.); U.S. patent application Ser. No. 13/367,047 for LASER SCANNING MODULES EMBODYING SILICONE SCAN ELEMENT WITH TORSIONAL HINGES, filed Feb. 6, 2012 (Feng et al.); U.S. patent application Ser. No. 13/400,748 for a LASER SCANNING BAR CODE SYMBOL READING SYSTEM HAVING INTELLIGENT SCAN SWEEP ANGLE ADJUSTMENT CAPABILITIES OVER THE WORKING RANGE OF THE SYSTEM FOR OPTIMIZED BAR CODE SYMBOL READING PERFORMANCE, filed Feb. 21, 2012 (Wilz); U.S. patent application Ser. No. 13/432,197 for a LASER SCANNING SYSTEM USING LASER BEAM SOURCES FOR PRODUCING LONG AND SHORT WAVELENGTHS IN COMBINATION WITH BEAM-WAIST EXTENDING OPTICS TO EXTEND THE DEPTH OF FIELD THEREOF WHILE RESOLVING HIGH RESOLUTION BAR CODE SYMBOLS HAVING MINIMUM CODE ELEMENT WIDTHS, filed Mar. 28, 2012 (Havens et al.); U.S. patent application Ser. No. 13/492,883 for a LASER SCANNING MODULE WITH ROTATABLY ADJUSTABLE LASER SCANNING ASSEMBLY, filed Jun. 10, 2012 (Hennick et al.); U.S. patent application Ser. No. 13/367,978 for a LASER SCANNING MODULE EMPLOYING AN ELASTOMERIC U-HINGE BASED LASER SCANNING ASSEMBLY, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780,356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney); U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,846 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); U.S. patent application Ser. No. 13/897,634 for a Laser Scanning Code Symbol Reading System Employing Programmable Decode Time-Window Filtering, filed May 20, 2013 (Wilz, Sr. et al.); U.S. patent application Ser. No. 13/902,242 for a System For Providing A Continuous Communication Link With A Symbol Reading Device, filed May 24, 2013 (Smith et al.); U.S. patent application Ser. No. 13/902,144, for a System and Method for Display of Information Using a Vehicle-Mount Computer, filed May 24, 2013 (Chamberlin); and U.S. patent application Ser. No. 13/902,110 for a System and Method for Display of Information Using a Vehicle-Mount Computer, filed May 24, 2013 (Hollifield).

In the specification and figures, typical embodiments of the invention have been disclosed. The present invention is not limited to such exemplary embodiments. Unless otherwise noted, specific terms have been used in a generic and descriptive sense and not for purposes of limitation.

The invention claimed is:

1. A method of error correction for a 3D scanner, comprising:

providing a plurality of three-dimensional calibration objects each having a known height, width and length, wherein no two calibration objects have the same shape, and wherein each calibration object is configured such that its height, width and length can be measured using a 3D scanner;

providing a 3D scanner having a field of view;

dividing the field of view into a plurality of sectors;

calculating the height measurement error for each of the plurality of sectors; and calculating a corrected height measurement for a target object positioned in a sector and scanned with the 3D scanner, the corrected height measurement being derived from both the measured height of the target object and the height measurement error corresponding to the sector in which the target object was positioned when scanned with the 3D scanner;

wherein calculating the height measurement error for a selected sector comprises the following substeps (a-d):

(a) positioning within the selected sector a calibration object that does not yet have a measured height associated with the selected sector;

(b) using the 3D scanner, scanning the positioned calibration object to obtain a measured height of the positioned calibration object, wherein the measured height is associated with the selected sector;

(c) repeating substeps (a) and (b) until each of the calibration objects has a measured height associated with the selected sector;

(d) for each calibration object, comparing the calibration object's known height to the calibration object's measured height associated with the selected sector.

2. The method of claim 1, comprising storing the calculated height measurement error for each of the plurality of sectors in a memory store.

3. The method of claim 1, comprising:

calculating the width measurement error for each of the plurality of sectors; and calculating a corrected width measurement for the target object, the corrected width measurement being derived from both the measured width of the target object and the width measurement error corresponding to the sector in which the target object was positioned when scanned with the 3D scanner;

wherein calculating the width measurement error for a selected sector comprises the following substeps (e-h):

(e) positioning within the selected sector a calibration object that does not yet have a measured width associated with the selected sector;

(f) using the 3D scanner, scanning the positioned calibration object to obtain a measured width of the positioned calibration object, wherein the measured width is associated with the selected sector;

(g) repeating substeps (e) and (f) until each of the calibration objects has a measured width associated with the selected sector;

(h) for each calibration object, comparing the calibration object's known width to the calibration object's measured width associated with the selected sector.

4. The method of claim 1, comprising:

calculating the length measurement error for each of the plurality of sectors; and calculating a corrected length measurement for the target object, the corrected length measurement being derived from both the measured length of the target object and the length measurement error corresponding to the sector in which the target object was positioned when scanned with the 3D scanner;

wherein calculating the length measurement error for a selected sector comprises the following substeps (i-l):

(i) positioning within the selected sector a calibration object that does not yet have a measured length associated with the selected sector;

(j) using the 3D scanner, scanning the positioned calibration object to obtain a measured length of the positioned calibration object, wherein the measured length is associated with the selected sector;

(k) repeating substeps (i) and (j) until each of the calibration objects has a measured length associated with the selected sector;

(l) for each calibration object, comparing the calibration object's known length to the calibration object's measured length associated with the selected sector.

5. The method of claim 1, wherein each sector is located on a common horizontal plane.

6. The method of claim 5, wherein the horizontal plane is the ground plane.

7. A method of error correction for a 3D scanner, comprising:

providing a plurality of three-dimensional calibration objects each having a known height, width and length, wherein no two calibration objects have the same shape, and wherein each calibration object is configured such that its height, width and length can be measured using a 3D scanner;

providing a 3D scanner having a field of view;

dividing the field of view into a plurality of sectors;

for each of the plurality of sectors, calculating the height measurement error, the width measurement error, and the length measurement error;

calculating a corrected height measurement for a target object positioned in a sector and scanned with the 3D scanner, the corrected height measurement being derived from both the measured height of the target object and the height measurement error corresponding to the sector in which the target object was positioned when scanned with the 3D scanner;

calculating a corrected width measurement for the target object, the corrected width measurement being derived from both the measured width of the target object and the width measurement error corresponding to the sector in which the target object was positioned when scanned with the 3D scanner; and calculating a corrected length measurement for the target object, the corrected length measurement being derived from both the measured length of the target object and the length measurement error corresponding to the sector in which the target object was positioned when scanned with the 3D scanner;

wherein calculating the height measurement error for a selected sector comprises the following substeps:

(a) positioning within the selected sector a calibration object that does not yet have a measured height associated with the selected sector;

(b) using the 3D scanner, scanning the positioned calibration object to obtain a measured height of the positioned calibration object, wherein the measured height is associated with the selected sector;

(c) repeating substeps (a) and (b) until each of the calibration objects has a measured height associated with the selected sector;

(d) for each calibration object, comparing the calibration object's known height to the calibration object's measured height associated with the selected sector;

wherein calculating the width measurement error for a selected sector comprises the following substeps (e-h):

(e) positioning within the selected sector a calibration object that does not yet have a measured width associated with the selected sector;

(f) using the 3D scanner, scanning the positioned calibration object to obtain a measured width of the positioned calibration object, wherein the measured width is associated with the selected sector;

(g) repeating substeps (e) and (f) until each of the calibration objects has a measured width associated with the selected sector;

(h) for each calibration object, comparing the calibration object's known width to the calibration object's measured width associated with the selected sector;

wherein calculating the length measurement error for a selected sector comprises the following substeps (i-l):

(i) positioning within the selected sector a calibration object that does not yet have a measured length associated with the selected sector;

(j) using the 3D scanner, scanning the positioned calibration object to obtain a measured length of the positioned calibration object, wherein the measured length is associated with the selected sector;

(k) repeating substeps (i) and (j) until each of the calibration objects has a measured length associated with the selected sector;

(l) for each calibration object, comparing the calibration object's known length to the calibration object's measured length associated with the selected sector.

8. The method of claim 7, wherein each sector is located on a common horizontal plane.

9. The method of claim 8, wherein the horizontal plane is the ground plane.

10. A method of error correction for a 3D scanner, comprising:

providing a plurality of three-dimensional calibration objects each having a first known dimension, a second known dimension, and a third known dimension, wherein no two calibration objects have the same shape, and wherein each calibration object is configured such that its height, width and length can be measured using a 3D scanner;

providing a 3D scanner having a field of view;

dividing the field of view into a plurality of sectors;

for each calibration object, calculating a first dimension measurement error for each sector;

if all calculated first dimension measurement errors associated with a selected sector are equal, associating the first dimension measurement error with the selected sector and storing the first dimension measurement error in a memory store;

when scanning a target object positioned in a selected sector, calculating a corrected first dimension measurement of the target object based upon the first measured dimension of the target object and the stored first dimension measurement error associated with the selected sector;

wherein calculating a first dimension measurement error for a selected sector comprises the following substeps (a-d):

(a) positioning within the selected sector a calibration object that does not yet have a first measured dimension associated with the selected sector;

(b) using the 3D scanner, scanning the positioned calibration object to obtain a first measured dimension of the positioned calibration object, wherein the first measured dimension is associated with the selected sector;

(c) repeating substeps (a) and (b) until each of the calibration objects has a first measured dimension associated with the selected sector;

(d) for each calibration object, comparing the calibration object's first known dimension to the calibration object's first measured dimension associated with the selected sector.

11. The method of claim 10, wherein the first known dimension is the object's height and the first measured dimension is a height.

12. The method of claim 10, wherein the first known dimension is the object's width and the first measured dimension is a width.

13. The method of claim 10, wherein the first known dimension is the object's length and the first measured dimension is a length.

14. The method of claim 10, comprising:

for each calibration object, calculating a second dimension measurement error for each sector;

if all calculated second dimension measurement errors associated with a selected sector are equal, associating the second dimension measurement error with the selected sector and storing the second dimension measurement error in a memory store; and when scanning a target object positioned in a selected sector, calculating a corrected second dimension measurement of the target object based upon the second measured dimension of the target object and the stored second dimension measurement error associated to the selected sector;

wherein calculating a second dimension measurement error for a selected sector comprises the following substeps (e-h):

(e) positioning within the selected sector a calibration object that does not yet have a second measured dimension associated with the selected sector;

(f) using the 3D scanner, scanning the positioned calibration object to obtain a second measured dimension of the positioned calibration object, wherein the second measured dimension is associated with the selected sector;

(g) repeating substeps (e) and (f) until each of the calibration objects has a second measured dimension associated with the selected sector;

(h) for each calibration object, comparing the calibration object's second known dimension to the calibration object's second measured dimension associated with the selected sector.

15. The method of claim 14, wherein:
the first known dimension is the object's height;
the first measured dimension is a height;
the second known dimension is the object's width; and
the second measured dimension is a width.

16. The method of claim 14, wherein:
the first known dimension is the object's height;
the first measured dimension is a height;
the second known dimension is the object's length; and
the second measured dimension is a length.

17. The method of claim 14, wherein:
the first known dimension is the object's width;
the first measured dimension is a width;
the second known dimension is the object's length; and
the second measured dimension is a length.

18. The method of claim 14, comprising:

for each calibration object, calculating a third dimension measurement error for each sector;

if all calculated third dimension measurement errors associated with a selected sector are equal, associating the third dimension measurement error with the selected sector and storing the third dimension measurement error in a memory store; and when scanning a target object positioned in a selected sector, calculating a corrected third dimension measurement of the target object based upon the third measured dimension of the target object and the stored third dimension measurement error associated to the selected sector;

wherein calculating a third dimension measurement error for a selected sector comprises the following substeps (i-l):

(i) positioning within the selected sector a calibration object that does not yet have a third measured dimension associated with the selected sector;

(j) using the 3D scanner, scanning the positioned calibration object to obtain a third measured dimension of the positioned calibration object, wherein the third measured dimension is associated with the selected sector;

(k) repeating substeps (i) and (j) until each of the calibration objects has a third measured dimension associated with the selected sector;

(l) for each calibration object, comparing the calibration object's third known dimension to the calibration object's third measured dimension associated with the selected sector.

19. The method of claim 18, wherein:
the first known dimension is the object's height;
the first measured dimension is a height;
the second known dimension is the object's width;
the second measured dimension is a width;
the third known dimension is the object's length; and
the third measured dimension is a length.

20. The method of claim 10, wherein each sector is located on the ground plane.

* * * * *